United States Patent
Pettigrew et al.

(10) Patent No.: US 8,401,284 B2
(45) Date of Patent: Mar. 19, 2013

(54) COLOR CORRECTING METHOD AND APPARATUS

(75) Inventors: Daniel Pettigrew, Pacific Palisades, CA (US); Dan Candela, Beverly Hills, CA (US)

(73) Assignee: Apple Inc., Cupertino, CA (US)

( * ) Notice: Subject to any disclaimer, the term of this patent is extended or adjusted under 35 U.S.C. 154(b) by 1252 days.

(21) Appl. No.: 12/154,988

(22) Filed: May 28, 2008

(65) Prior Publication Data

US 2009/0297022 A1 Dec. 3, 2009

(51) Int. Cl.
*G06K 9/00* (2006.01)

(52) U.S. Cl. ...................................... 382/162

(58) Field of Classification Search .......... 382/162–167, 382/254, 274; 358/500–540, 1.9; 345/589–609; 715/700, 723
See application file for complete search history.

(56) References Cited

U.S. PATENT DOCUMENTS

| | | | |
|---|---|---|---|
| 4,476,487 A * | 10/1984 | Klie et al. ..................... | 358/531 |
| 5,130,789 A | 7/1992 | Dobbs et al. | |
| 5,589,890 A | 12/1996 | Mancuso et al. | |
| 5,751,845 A * | 5/1998 | Dorff et al. ................... | 382/162 |
| 6,266,103 B1 | 7/2001 | Barton et al. | |
| 6,362,829 B1 | 3/2002 | Omvik et al. | |
| 6,944,335 B2 * | 9/2005 | Pettigrew et al. ............. | 382/167 |
| 7,123,269 B1 | 10/2006 | Bourdey et al. | |
| 7,256,911 B2 * | 8/2007 | Takabayashi et al. ......... | 358/1.9 |
| 7,978,938 B1 | 7/2011 | Wilensky | |
| 2001/0036310 A1 | 11/2001 | Pettigrew et al. | |
| 2002/0041707 A1 | 4/2002 | Newman | |
| 2003/0103234 A1 | 6/2003 | Takabayashi et al. | |
| 2004/0114904 A1 | 6/2004 | Sun et al. | |
| 2006/0028483 A1 | 2/2006 | Kondo et al. | |
| 2007/0065006 A1 | 3/2007 | Wilensky | |
| 2008/0131010 A1 | 6/2008 | Wilensky | |

(Continued)

FOREIGN PATENT DOCUMENTS

| | | |
|---|---|---|
| EP | 1 294 177 A2 | 3/2003 |
| JP | 2004-228734 | 8/2004 |

(Continued)

OTHER PUBLICATIONS

International Search Report and Written Opinion for PCT/US2009/045095, Jul. 23, 2009 (mailing date), Pettigrew, Daniel et al.

(Continued)

*Primary Examiner* — Ishrat I Sherali

(74) *Attorney, Agent, or Firm* — Schwegman Lundberg & Woessner, P.A.

(57) ABSTRACT

Some embodiments provide a method of color correcting an image. Some such embodiments provide (1) a display area for displaying a modifiable graph correlating a first color attribute of the image to a set of second color attributes and (2) at least one tool that adjusts the graph in order to adjust color attributes in the image. The graph adjustment tool of some embodiments is a set of control points that specify the color correction adjustment over a parameterized curve representation of the graph. In some embodiments, the graphs are rasterized curves that are adjusted through the use of a Gaussian manipulator. The Gaussian manipulator distributes a second color attribute adjustment over a set of first color attribute values according to a Gaussian distribution. Moreover, some embodiments allow for the selective switching between the parameterized and rasterized curves or the control points and the Gaussian manipulator.

27 Claims, 40 Drawing Sheets

U.S. PATENT DOCUMENTS

2009/0204913 A1   8/2009   Kawano et al.
2010/0080448 A1   4/2010   Tam et al.

FOREIGN PATENT DOCUMENTS

WO   PCT/US2009/045095   5/2009
WO   WO 2009/146296   12/2009

OTHER PUBLICATIONS

"Adobe Photoshop 5.0 Limited Edition, Chapter 4: Making Color and Tonal Adjustments", Adobe Photoshop 5.0 User Guide, Jan. 1, 1998, pp. 67-89.

International Preliminary Report on Patentability for PCT/US2009/045095, Nov. 30, 2010 (issuance date), Apple Inc.

Liang, Jianming, et al., "United Snakes", The Proceedings of the Seventh IEEE International Conference on Computer Vision (ICCV), Sep. 20-27, 1999, vol. 2, pp. 933-940, IEEE, Kerkyra, Greece.

U.S. Appl. No. 13/134,289, filed Jun. 3, 2011, Pettigrew, Daniel, et al.

Acton, Scott T., "Multigrid Anisotropic Diffusion," IEEE Transactions on Image Processing, Mar. 1998, vol. 7, No. 3, pp. 280-291, IEEE.

Author Unknown, "Adobe Director 11: User Guide," Month Unknown, 2008, 498 pages, Adobe Systems Incorporated, San Jose, California, USA.

Author Unknown, "Adobe Premiere Pro CS3: User Guide," Month Unknown, 2007, 455 pages, Adobe Systems Incorporated, San Jose, California, USA.

Author Unknown, "Sigmoidal Contrast for Gimp", Sep. 5, 2010, 1 page, http://www.mm-log.com/blog/2010-05-09/sigmoidal-contrast.gimp.

Author Unknown, "Sigmoidal Non-Linearity Contrast", date unknown but on or before Feb. 9, 2007, 2 pages, http://www.imagemagick.org/Usage/color_mods/#sigmoidal.

Author Unknown, "Using Adobe Premiere Elements 8 Editor," Month Unknown, 2009, Adobe Systems Incorporated, San Jose, California, USA.

Fischl, Bruce, et al., "Adaptive Nonlocal Filtering: A Fast Alternative to Anisotropic Diffusion for Image Enhancement," IEEE Transactions on Pattern Analysis and Machine Intelligence, Jan. 1999, pp. 42-48, vol. 21, No. 1, IEEE Inc., New York, USA.

McHugh, Sean, "Tutorials: Photoshop Curves," date unknown but on or before Nov. 25, 2005, pp. 1-7. http://www.cambridgeincolour.com/tutorials/photoshop-curves.htm.

Kang, Hyung Woo, et al., "Enhanced lane: interactive image segmentation by incremental path map construction," Graphical Models, Sep. 1, 2002, pp. 282-303, vol. 64, No. 5, Elsevier, San Diego, CA, USA.

* cited by examiner

COLOR CORRECTING METHOD AND APPARATUS

FIELD OF THE INVENTION

The present invention is directed towards media editing. Specifically, to novel methods for color correcting attributes of an image.

BACKGROUND OF THE INVENTION

Digital graphic design, image editing, and media editing applications (hereafter collectively referred to as media editing applications) provide designers and artists with the necessary tools to create much of the media seen today through the various media outlets. These tools permit designers the ability to edit different color attributes of an image in order to produce a digitally modified image.

Some adjustable color attributes of an image include the hue, saturation, luminance, chrominance, brightness, red color, green color, and blue (RGB) color, etc. Accordingly, some prior art media editing applications provide different tools to adjust the various color attributes differently. FIG. 1 presents a first prior art media editing interface with tools for editing the hue, lightness, and saturation of the image. FIG. 2 presents a second prior art media editing interface with tools for editing the brightness and contrast of the image.

While the media editing tools of FIGS. 1 and 2 provide the ability to modify different color attributes of the image, a user must access each such tool separately. In many instances, the tools are located in distinct graphical windows with each tool having a different manner for implementing the functionality associated with the tool. Accordingly, users must first learn of the layout of the media editing application and locations of each of the tools before being able to access the tools. Additionally, the user must switch between multiple different media editing interface windows in order to perform different manipulations to different color attributes of the image. As such, the user must manage multiple different windows with each window occupying display space that could otherwise be used to specify and perform adjustments across a larger portion of the image.

A further shortcoming of the prior art media editing tools is the lack of customized control provided by each such tool. For instance, each of the tools presented in FIGS. 1 and 2 perform a global effect on the image. Specifically, a user adjustment to the brightness control of FIG. 2 adjusts the brightness color attribute of the image as a whole. Similarly, a user adjustment to the saturation color attribute of FIG. 1 performs a global adjustment to the color saturation of the image. As such, the user is unable to modify the brightness or saturation over only a particular set of color attribute color attribute values. Rather, these media editing tools require the user to perform global changes to all color attribute values of pixels in an image.

Some prior art media editing interfaces have attempted to overcome these limitations by providing tools with the ability to specify adjustments that affect only particular image color attribute values. FIG. 3 presents a prior art media editing interface for specifying an adjustment to a selectable range of red color attribute values of an image. In this figure, the red color attribute is graphically displayed with two control points 310 and 320. A user is able to introduce or remove additional control points along the graph. By manipulating the control points, the user is able to increase or decrease red color attribute values for pixels in an image having specified red color attribute values.

FIG. 4 presents the prior art media editing interface of FIG. 3 after an additional control point 410 is introduced between control points 310 and 320 and the control point 410 is adjusted. As a result, the red color attribute values for only those pixels of the image having red color attribute values between control points 310 and 320 will be increased.

FIG. 5 presents an alternative prior art media editing interface for specifying a selective adjustment to a specific range of color attribute of an image. In this figure, users select the range of color attribute values to be adjusted using the slider control 510. The width of the slider control 510 is adjustable such that users are able to select a smaller or larger range of values. Users specify the amount of adjustment to the selected range of values using the three color attribute controls 520.

However, the prior art media editing interfaces of FIGS. 4 and 5 still restrict the user's ability to specify fully customized adjustments. For instance, the interface of FIG. 4 allows for adjustments only to the red, green, or blue color channels and the interface of FIG. 5 allows for adjustments only to the hue, saturation, and lightness color attributes. Additionally, adjustments specified using the interface of FIG. 4 are constrained within neighboring sets of control points. For example, even though control point 410 is adjusted, the adjustment is constrained to color attribute values falling within the range defined by control points 310 and 320 that neighbor the control point 410. Such a color correction creates a sharp contrast within the image as a result of the parameterized nature of the curve in which mathematical functions define the interconnection between each of the control points 310, 410, and 320. In FIG. 5, adjustments specified using the interface are distributed across the range of color attribute specified by the slider control 510. For example, the center region 530 of the slider control 510 specifies color attribute values that are to receive a full adjustment whereas the outer regions 540 and 550 specify color attribute values that are to receive a gradually decreasing amount of the adjustment. However, the interface of FIG. 5 does not allow for multiple different ranges of color attribute values to be selected for adjustment.

Accordingly, there is a need for simplifying and improving the functionality of media editing tools within a media editing interface. Additionally, there is a concurrent but conflicting need to enhance the amount of customized control provided by the media editing tools of one such media editing interface. More specifically, there is a need for such a media editing interface to provide tools that allow a user the ability to customize the color correction adjustment by specifying any combination of different color attributes from which to perform the adjustment. There is need to further customize the color correction adjustment by allowing users to specify multiple different color correction adjustments over different sets of color attribute values through the single interface. There is also a need to customize the color correction adjustment by allowing users to alternate between different adjustment distributions such that a desired result is achieved by fine tuning a result produced one distribution using a different distribution.

SUMMARY OF THE INVENTION

Some embodiments provide a method of color correcting an image formed by a number of pixels that are each defined by reference to one or more color attributes. In some embodiments, the method provides (1) a display area that displays a modifiable graph correlating a first color attribute to a set of second color attributes of the image, and (2) at least one graph adjustment tool that adjusts the graph in order to adjust one or more color attributes in the image.

In some embodiments, the color attributes include two or more of the following: color balance, luminescence, hue, saturation, red color, green color, and blue color. It should be apparent to one of ordinary skill in the art that this list is not exhaustive but illustrative in purpose. To specify the two different color attributes that are correlated by the graph, some embodiments provide (1) a first set of selectable items that defines the first color attribute to represent along a horizontal first axis of the graph, and (2) a second set of selectable items that defines the set of second color attributes to represent along a vertical second axis of the graph. In this manner, users are able to specify any custom combination of color attributes from which to specify color correction adjustments.

After defining the color attributes for the graph, the graph then correlates a range of values for the first color attribute to a range of values for the set of second color attributes. Initially, the shape of the graph is determined by default second color attribute values at the various first color attribute values of the image. The default second color attribute values represent existing values for the second color attributes as they exist within the unmodified image. In some embodiments, these default second color attribute values are normalized such that the initial graph is presented as a flat line.

Modifying the graph then specifies an amount of amplification or deamplification to apply to the existing values based on an amount of the modification. In this manner, users specify relative color correction adjustments by using the first attribute values along the horizontal axis to identify particular sets of second color attribute values for adjustment. For instance, in a graph representing a saturation color attribute of an image along the first horizontal axis and a brightness color attribute of the image along the second vertical axis, modifying a particular point on the graph amplifies or deamplifies brightness values for pixels with a particular saturation value. The particular saturation value is determined from the position of the particular point along the horizontal axis of the graph. The amount by which to amplify or deamplify the brightness values is determined from the vertical distance between the original position of the particular point and the modified position of the particular point.

The graph adjustment tool of some embodiments is a set of control points that allows users to adjust the graph. In some embodiments, the set of control points are points that are associated with the graph. The control points may be associated with the graph in any number of ways. For example, the control points may include points on the graph or points off the graph.

The graphs of some embodiments are deformable parameterized curves and the control points provide the means for deforming the graphs. For instance, in some embodiments, the graphs are formed by a set of Bezier curves interconnecting the control points. Additionally, the control points may include modifiable tangent lines for further control over the color correction adjustment. Using these graph adjustment tools (e.g., the control points and the tangent lines), users are able to quickly produce sharp and contrasting color correction adjustments to the image.

In some embodiments, the graphs are rasterized curves that are adjusted through the use of a Gaussian manipulator. The Gaussian manipulator is a graph adjustment tool that identifies a set of first color attribute values over which to distribute a second color attribute adjustment according to a Gaussian distribution. To specify the Gaussian distribution, some embodiments display a graphical representation of the Gaussian manipulator over the graph. By modifying the shape of the graphical representation, users control parameters of the distribution such as the height of the Gaussian peak (i.e., amplitude) and width of the Gaussian bump. Using this graph adjustment tool, users are able to quickly and automatically produce smooth and blended color correction adjustments to the image. Even though the Gaussian manipulator is described above with reference to a graph that correlates two or more different color attributes, it should be apparent to one of ordinary skill in the art that the Gaussian manipulator is similarly applicable to a graph that correlates a single color attribute.

Accordingly, a particular adjustment made to the graph using the Gaussian manipulator produces a different distribution for a color correction adjustment than a similar adjustment made to the graph using the control points. Additionally, some embodiments provide a selectable user interface item for alternating between (1) the parameterized curves and rasterized curve or (2) the control points and the Gaussian manipulator. When alternating between the various curves or graph adjustment tools, the previously specified color correction adjustments are retained allowing the user to further modify or customize a resulting color correction distribution by means of a different color correction distribution. The different color correction distributions can thus be specified and combined in any manner to produce a desired color correction adjustment.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Overview

Some embodiments implement a novel color correcting methodology by providing a display area that displays a modifiable graph correlating a first color attribute of an image to a set of second color attributes of the image and at least one tool that adjusts the graph in order to adjust color attributes in the image. FIGS. 6-9 provide a conceptual overview of one media editing application implementing this methodology.

Figure 1:
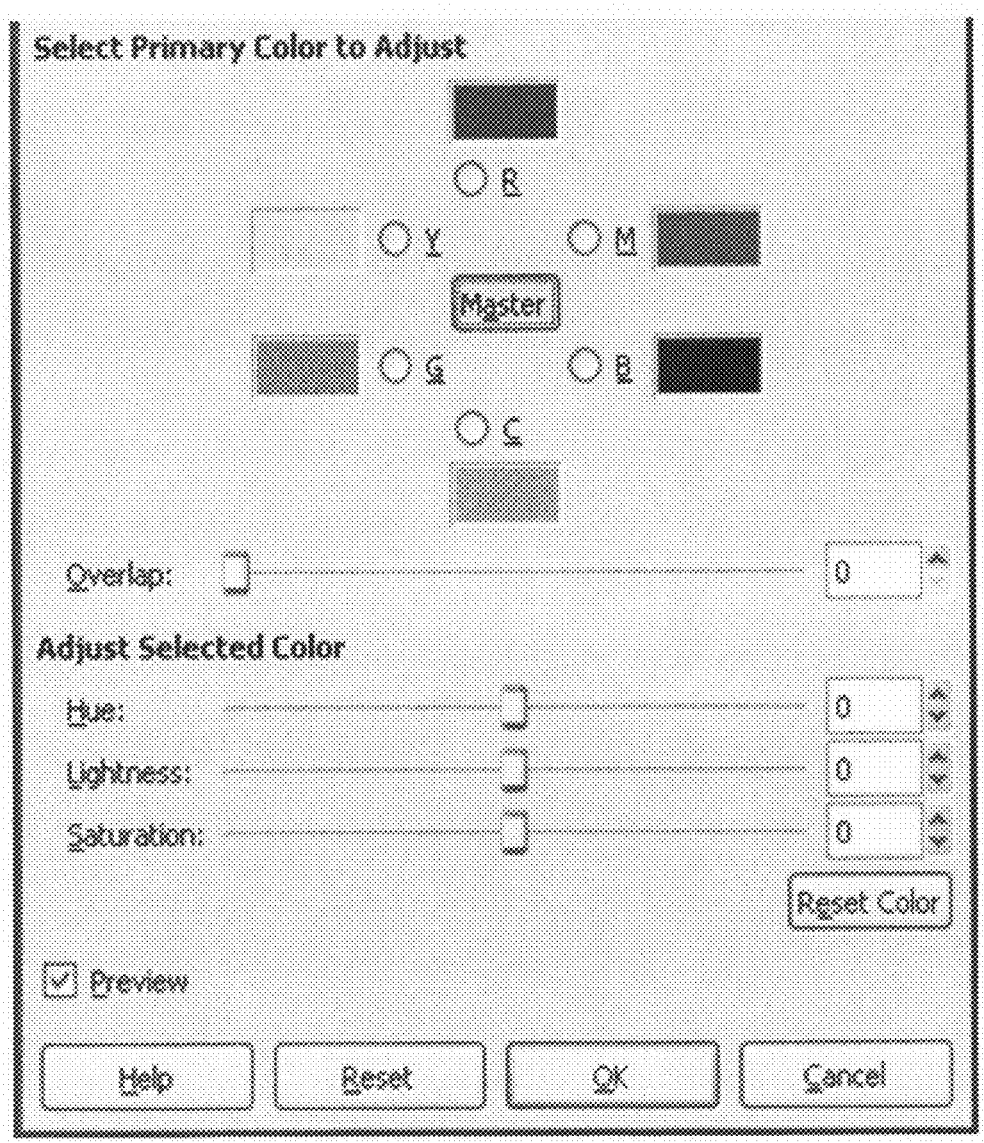
FIG. 1 presents a first prior art media editing interface with tools for editing the hue, lightness, and saturation of the image.
Figure 2:
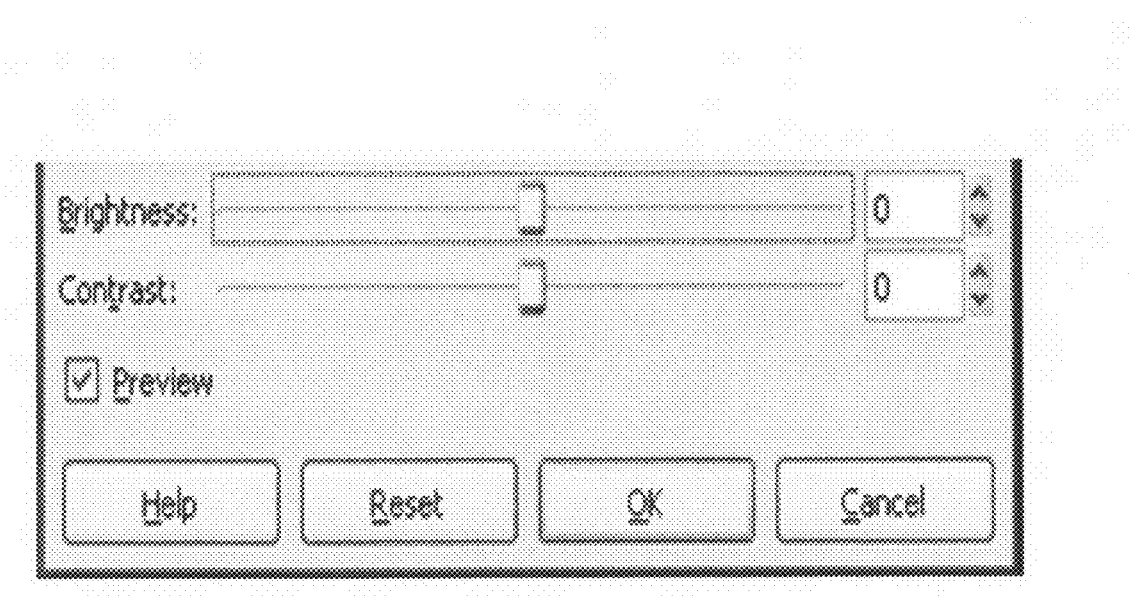
FIG. 2 presents a second prior art media editing interface with tools for editing the brightness and contrast of the image.
Figure 3:
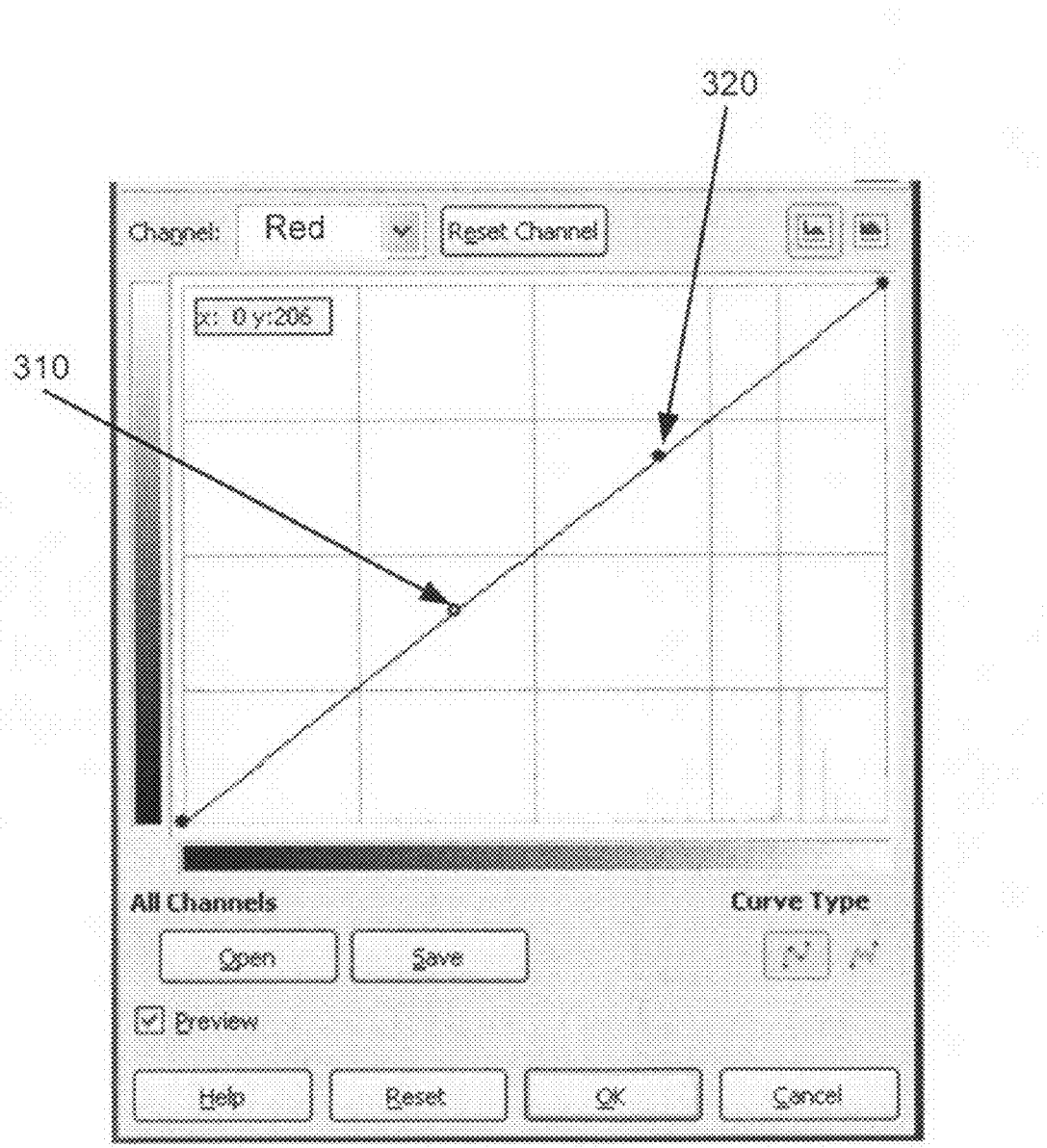
FIG. 3 presents a prior art media editing interface for specifying an adjustment to a selectable range of red color attribute values of an image.
Figure 4:
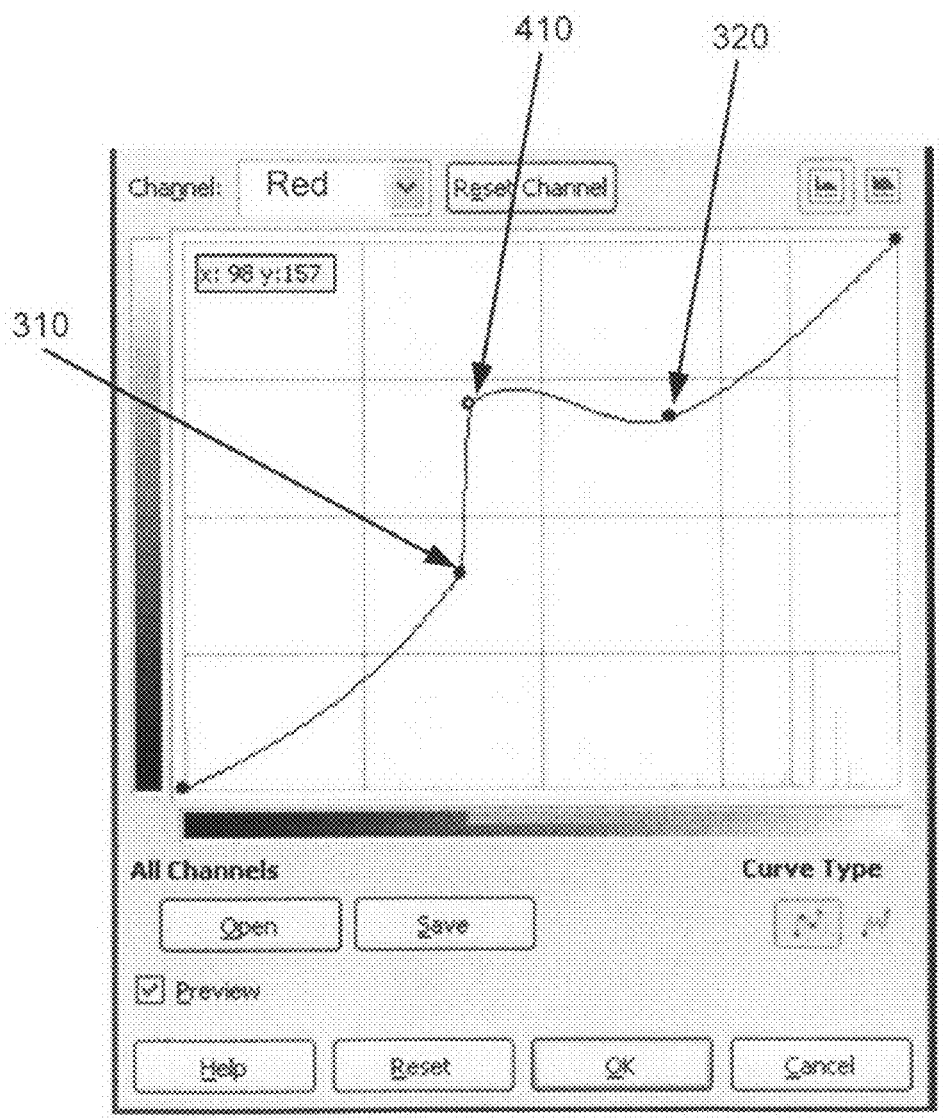
FIG. 4 presents the prior art media editing interface of FIG. 3 after an additional control point is introduced.
Figure 5:
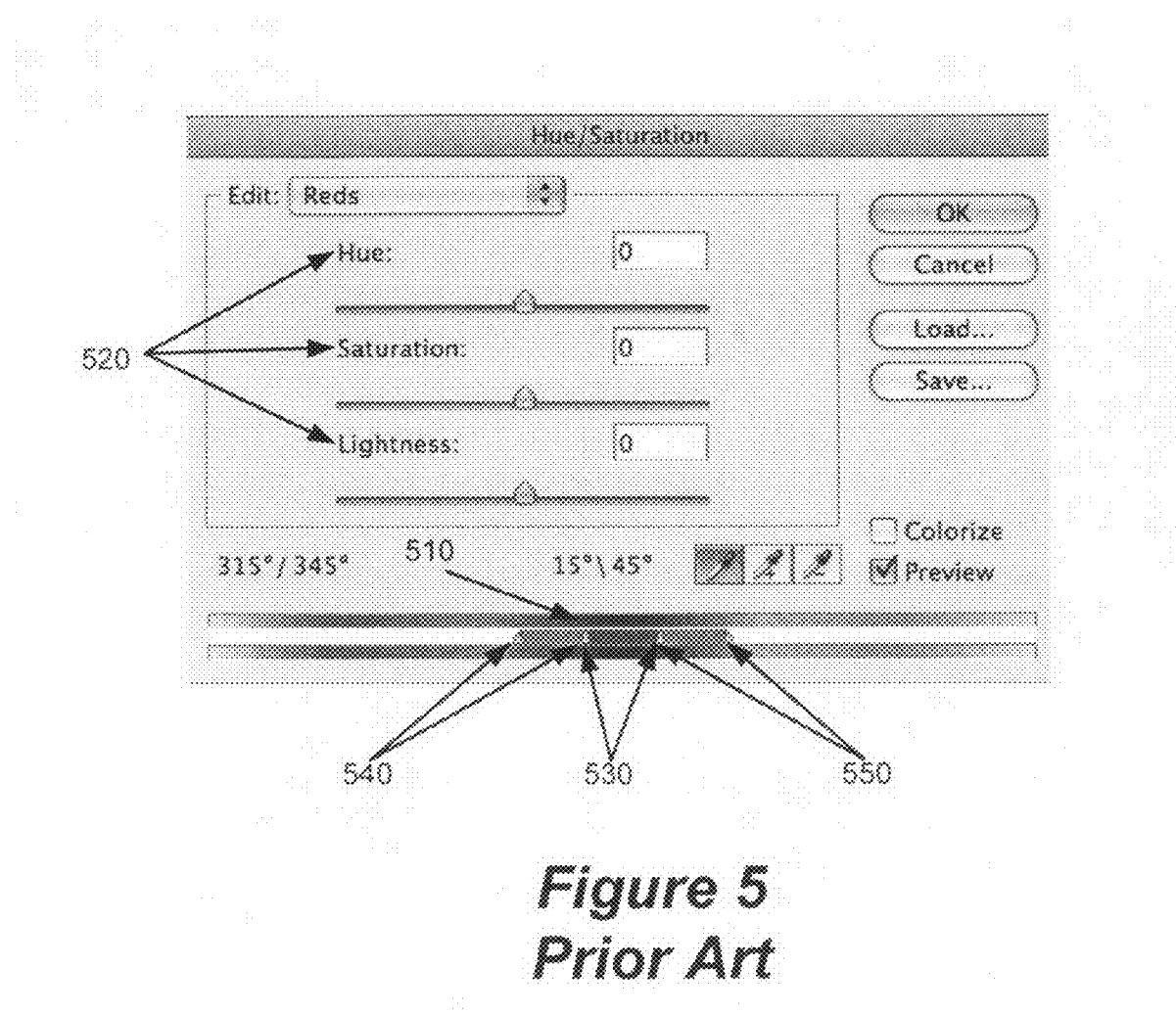
FIG. 5 presents an alternative prior art media editing interface for specifying a selective adjustment to a specific range of color attribute of an image.
Figure 6:
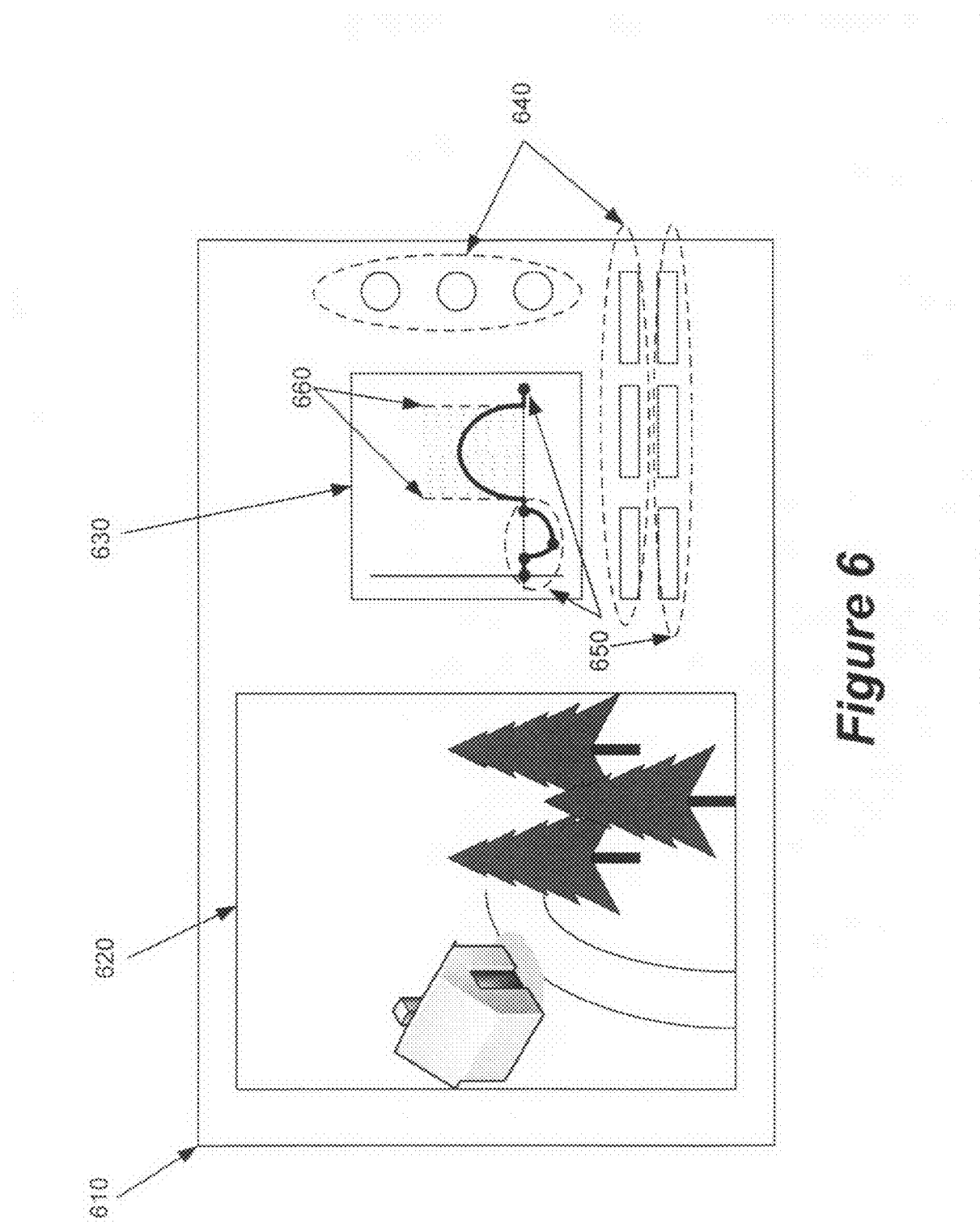
FIG. 6 illustrates a media editing application in accordance with some embodiments of the invention.

FIG. 6 illustrates a media editing application 610 in accordance with some embodiments of the invention. In this figure, the media editing application 610 includes: (1) a display window 620 that renders an image, (2) a display window 630 that displays a modifiable graph correlating a first color attribute of an image to a set of second color attributes of the image, (3) one or more selectable user interface items 640 to concatenate the set of second color attributes and to specify the correlation of the set of second color attributes to the first color attribute, and (4) one or more tools 650 to adjust the color attributes in the image.

Figure 7:
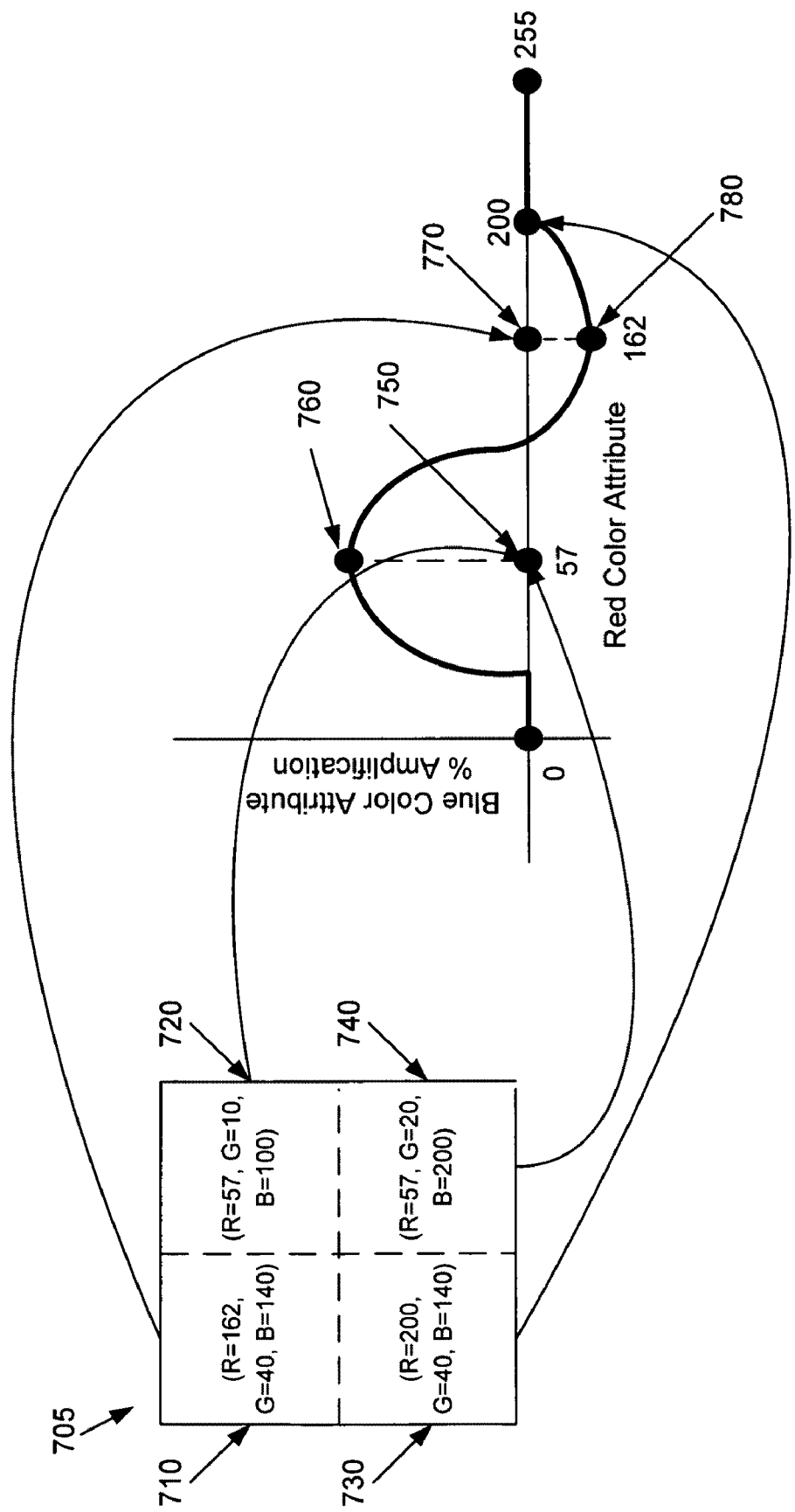
FIG. 7 illustrates a mapping of a first color attribute to a set of second color attributes of a modifiable graph from which users specify custom color correction adjustments.

The display window 630 maps the first color attribute to a horizontal first axis of the modifiable graph and a set of different second color attributes to a vertical second axis of the modifiable graph. In some embodiments, the color attributes represented by the axes of the graph include but are not limited to: color balance, luminescence, hue, saturation, red color, green color, and blue color. FIG. 7 illustrates a mapping of the first color attribute to the set of second color attributes of a modifiable graph from which users specify custom adjustments.

In FIG. 7, an image 705 with 4 pixels 710-740 is shown. Each pixel has a red, green, blue (RGB) color attribute value set. Each of the red, green, and blue color attributes ranges from a value of 0-255 when an 8 bit RGB color model defines the red, green, and blue color attributes of the image. As shown, pixel 710 specifies an RGB color attribute value set of (162, 40, 140), pixel 720 specifies an RGB color attribute value set of (57, 10, 100), pixel 730 specifies an RGB color attribute value set of (200, 40, 140), and pixel 740 specifies an RGB color attribute value set of (57, 20, 200). It should be apparent to one of ordinary skill in the art that different ranges of values may be used to represent the values for the various color attributes of an image. For instance, fractional values between 0 and 1 for a float type may be used to represent the color attribute values providing for a virtually unlimited range of possible values irrespective of the actual color model that is used.

In this figure, the horizontal axis of the graph spans the red color attribute values. Accordingly, pixels 720 and 740 that have the same red color attribute value (i.e., 57) are mapped to the same location 750 along the horizontal axis. In this manner, a single point along the graph may represent multiple pixels having the same first color attribute value but one or more different second color attribute values.

Initially, the graph is presented as a flat line. The flat line represents normalized default second color attribute values in the image. The default second color attribute values represent existing values for the second color attribute as they exist within the unmodified image. This normalization of the default second color attribute values provides a uniform initial representation (i.e., flat line) for the default second color attribute values irrespective of their actual values within the image.

A modification to the graph then specifies an amount of amplification or deamplification to the existing second color attribute values based on an amount of the modification. In this manner, users specify relative color corrections adjustments by using the red color attribute values along the horizontal axis to identify particular second color attribute values for adjustment. For example, assuming the blue color attribute is a second color attribute represented along the vertical axis of the graph, then an adjustment made to the graph at location 750 specifies an adjustment to the blue color attribute values for pixels 720 and 740, each having the red color attribute value (i.e., 57) represented by location 750 along the horizontal axis. If the adjustment increases the amplitude of 750 to location 760 then a corresponding amount of amplification is applied to the blue color attributes of pixels 720 and 740. Specifically, if the adjustment represents a 10% amplification, then the blue color attribute value for pixel 720 increases from a value of 100 to 110 and the blue color attribute value for pixel 740 increases from a value of 200 to 220.

It should be apparent to one of ordinary skill in the art that the vertical axis of the graph of some embodiments maps to multiple second color attributes. In this manner, a specified amount of amplification or deamplification is applied to the multiple second color attributes at the specified first color attribute values. For instance in FIG. 7, if the vertical axis maps to both the blue color attribute and the green color attribute, then specifying a 10% increase by moving location 750 to location 760 has the effect of increasing the blue color attribute value for pixel 720 from a value of 100 to 110, the green color attribute value for pixel 720 from a value of 50 to 55, the blue color attribute value for pixel 740 from a value of 200 to 220, and the green color attribute for pixel 740 from a value of 10 to 11.

Similarly, users may specify an amount of deamplification to apply to the set of second color attribute values by modifying the graph. For instance, by adjusting location 770 to location 780, the user specifies deamplifying the set of second color attribute values for pixels of the image having the red color attribute value represented by locations 770 and 780 (i.e., pixel 710 with a red color attribute value of 162).

In still other embodiments, a single graph is provided for each of the set of second color attributes. In this manner, different second color attribute adjustments may be specified for each of the second color attributes at different first color attribute values through the single display area of some embodiments.

Users specify the color attributes that are correlated by the graph, by using the selectable user interface items 640 of FIG. 6. In some embodiments, the selectable user interface items 640 specify the custom first and second color attribute combinations for the graph. In some such embodiments, the selectable user interface items 640 include (1) a first set of selectable items that defines the first color attribute to represent along a horizontal first axis of the graph, and (2) a second set of selectable items that defines the set of second color attribute to represent along a vertical second axis of the graph. The selectable interface items 640 for specifying the axes of the graph include modifiable graphical buttons, checkboxes, radio buttons, or drop down lists as some examples.

The user interface tools 650 provide the means by which to modify the graph to specify one or more second color attribute value adjustments relative to a first color attribute value. In some embodiments, the user interface tools 650 are control points for adjusting the graph. In some embodiments, the control points are points on the graph and in some other embodiments, the control points are points off of the graph.

The graphs of some embodiments are deformable parameterized curves and the control points provide the means for deforming the graph. The parameterized curves are defined between the control points using mathematical functions. In this manner, to construct or reconstruct the graph, some embodiments store only the control points from which the mathematical functions interconnecting the control points are regenerated. In other embodiments, the control points are stored along with the mathematical functions in order to construct or reconstruct a graph. Accordingly, an adjustment to a control point modifies parameters of the mathematical function defining the one or more curves connecting the control point to one or more neighboring control points.

In some embodiments, the parameterized curves interconnecting the control points of the graph are a set of Bezier curves. Additionally, the graph adjustment tools 750 provide modifiable tangent lines at the control points where the tangent lines provide additional control over the color correction adjustment. By deforming the graph using the above described graph adjustment tools, users are able (1) to select one or more first color attribute values and (2) to specify an amount of second color attribute adjustment to apply at the selected first color attribute values. Additionally, by using these graph adjustment tools (e.g., the control points and the tangent lines), users are able to quickly produce selective sharp and contrasting color correction adjustments to the image.

In some embodiments, the graphs are rasterized curves that are adjusted through the use of a Gaussian manipulator 650. The rasterized curves are comprised of independently defined points that together create the graph. Accordingly, to render the graph, the media editing interface of some embodiments stores values for each such point of the graph within its internal memory.

The Gaussian manipulator is a graph adjustment tool 650 that distributes a second color attribute adjustment over a set of first color attribute values according to a Gaussian distribution. To specify the Gaussian distribution, some embodiments display a graphical representation of the Gaussian manipulator 660 over the graph. By modifying the shape of the graphical representation 660, users control parameters of the distribution such as the height of the Gaussian peak (i.e., the amplitude) and width of the Gaussian bump. Using this graph adjustment tool, users are able to quickly and automatically produce selective smooth and blended color correction adjustments to the image.

Accordingly, a particular adjustment made to the graph using the Gaussian manipulator produces a different distribution for a color correction adjustment than a similar adjustment made to the graph using the control points. Additionally, some embodiments provide a selectable user interface item as one of the tool 650 for alternating between (1) the parameterized curves and rasterized curve or (2) the control points and the Gaussian manipulator. When alternating between the various curves or graph adjustment tools, the previously specified color correction adjustments are retained. In this manner, users are able to further modify or customize a resulting color correction distribution by means of a different color correction distribution.

Figure 8:
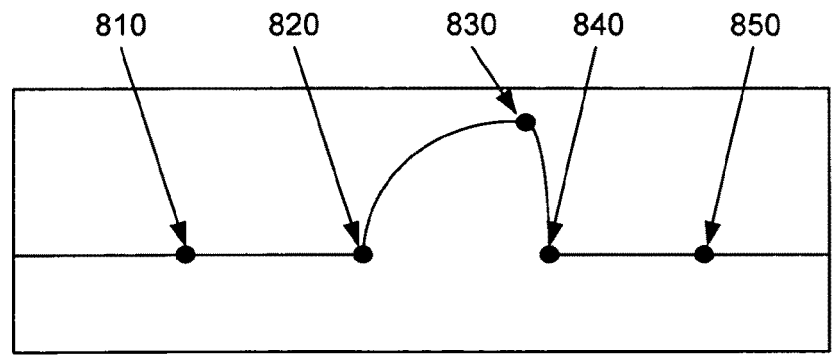
FIG. 8 illustrates color correction adjustments specified using the control point graph adjustment tools.

FIG. 8 illustrates color correction adjustments specified using the control point graph adjustment tools. In this figure, a parameterized representation of the graph includes control points 810-850 with parameterized curve functions defining the interconnections between the control points. Therefore, when control point 830 is modified, a first adjustment is made to values falling along the parameterized curve between control points 820 and 830 and a second adjustment is made to values falling along the parameterized curve between control points 830 and 840. The color correction is therefore only applied to pixels with first color attribute values that fall between the range of values defined between control points 820 and 840. There is no adjustment to any values falling along the parameterized curves between control points 810 and 820 and between control points 840 and 850. As a result, such color corrections are useful when the desired result is to produce a sharp contrast within a set of color attribute values in an image or to emphasize or deemphasize certain color attribute values without affecting other color attribute values in the image.

Figure 9:
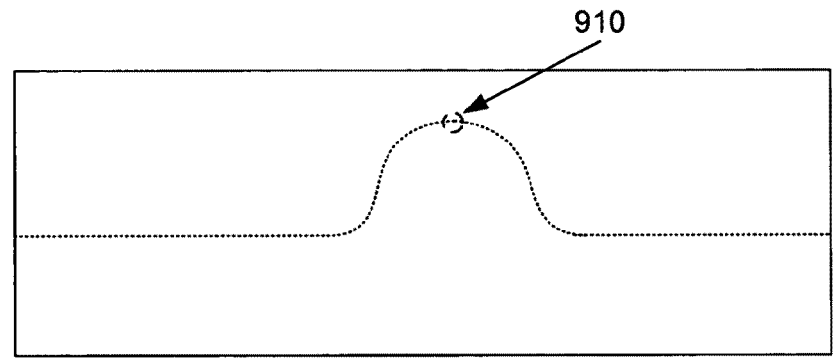
FIG. 9 illustrates color correction adjustments to the graph of FIG. 8 specified using the Gaussian manipulator graph adjustment tool.

However, some users also desire to produce smooth and blended color corrections to color attributes of an image. In such cases, users specify color correction adjustments using the Gaussian manipulator tool of some embodiments. FIG. 9 illustrates color correction adjustments to the graph of FIG. 8 using the Gaussian manipulator graph adjustment tool.

In this figure, the graph is a rasterized curve as represented by the dotted representation. A specified color correction applied by adjusting point 910 of the graph causes the color correction to be distributed according to a Gaussian distribution. Specifically, point 910 receives the specified amount of adjustment as determined by the amount of adjustment to the graph. The adjustment is then distributed across a range of first color attribute values such that those pixels in the image having similar first color attribute values to the selected point 910 receive some second color attribute adjustment that is less than the second color attribute adjustment to point 910.

Figure 10:
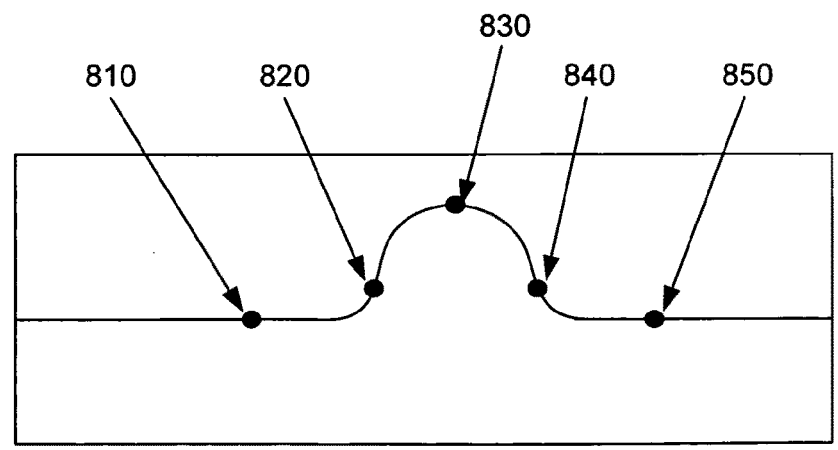
FIG. 10 illustrates the modified graph of FIG. 9 after a user switches back to a parameterized representation.

As noted above, users are able to convert between the rasterized representation of the graph in FIG. 9 back to the parameterized representation of the graph or between the control point graph adjustment tools and the Gaussian manipulator graph adjustment tool. FIG. 10 illustrates the modified graph of FIG. 9 after a user switches back to the parameterized representation. As shown in FIG. 10, the control points 810-850 are reintroduced into the graph. However, due to the Gaussian distribution, the location of each of the control points 810-850 has shifted to coincide with the shift produced by the Gaussian manipulator. It should be apparent to one of ordinary skill in the art that in some embodiments the parameterized and rasterized representations of the graph are internal representations. In some such embodiments, the graph does not appear to change when a user switches between the various representations. Accordingly, some embodiments seamlessly transition between the various representations of the graph in order to produce the different color correction adjustments.

Through the various graphical adjustment tools, users are able to customize (1) a selected set of non-contiguous pixels to receive adjustment, (2) the color attributes to be adjusted at the selected set of pixels, (3) the amount by which to adjust each color attribute, and (4) the manner in which to apply the adjustment over pixels of the image. Moreover, users are provided such functionality through a single media editing interface.

Several more detailed embodiments of the invention are described in the sections below. Section II describes several more embodiments for a media editing interface of a media editing application for specifying relative color correction adjustments in accordance with some embodiments of the invention. Next, Section III describes various graph adjustment tools for performing a color correction adjustment in accordance with some embodiments. Section IV describes a media editing application implementing the media editing interface of some embodiments. Lastly, Section V describes a computer system with which some embodiments of the invention are implemented.

II. Media Editing Interface for Specifying Relative Adjustments

As noted above, some embodiments provide a media editing interface for specifying color correction adjustments to an image. In some embodiments, the specified color correction adjustments include adjusting a set of second image color attributes relative to a first image color attribute. A relative adjustment adjusts the set of second color attribute values by a specified amount for those pixels of an image that have first color attribute values falling within a specified range of first color attribute values. As an example, a second color attribute represents a red color attribute for pixels of an image, a first color attribute represents a lightness color attribute for pixels of the image, and a relative adjustment includes amplifying or deamplifying the red color intensity for those pixels of the image that have one or more specified lightness values.

This functionality enables users to generate custom effects that target particular image color attribute values or regions of the image. Accordingly, users are able to selectively adjust color attributes for highlights or shadows appearing within an image without affecting other regions of the image as one example.

Figure 11:
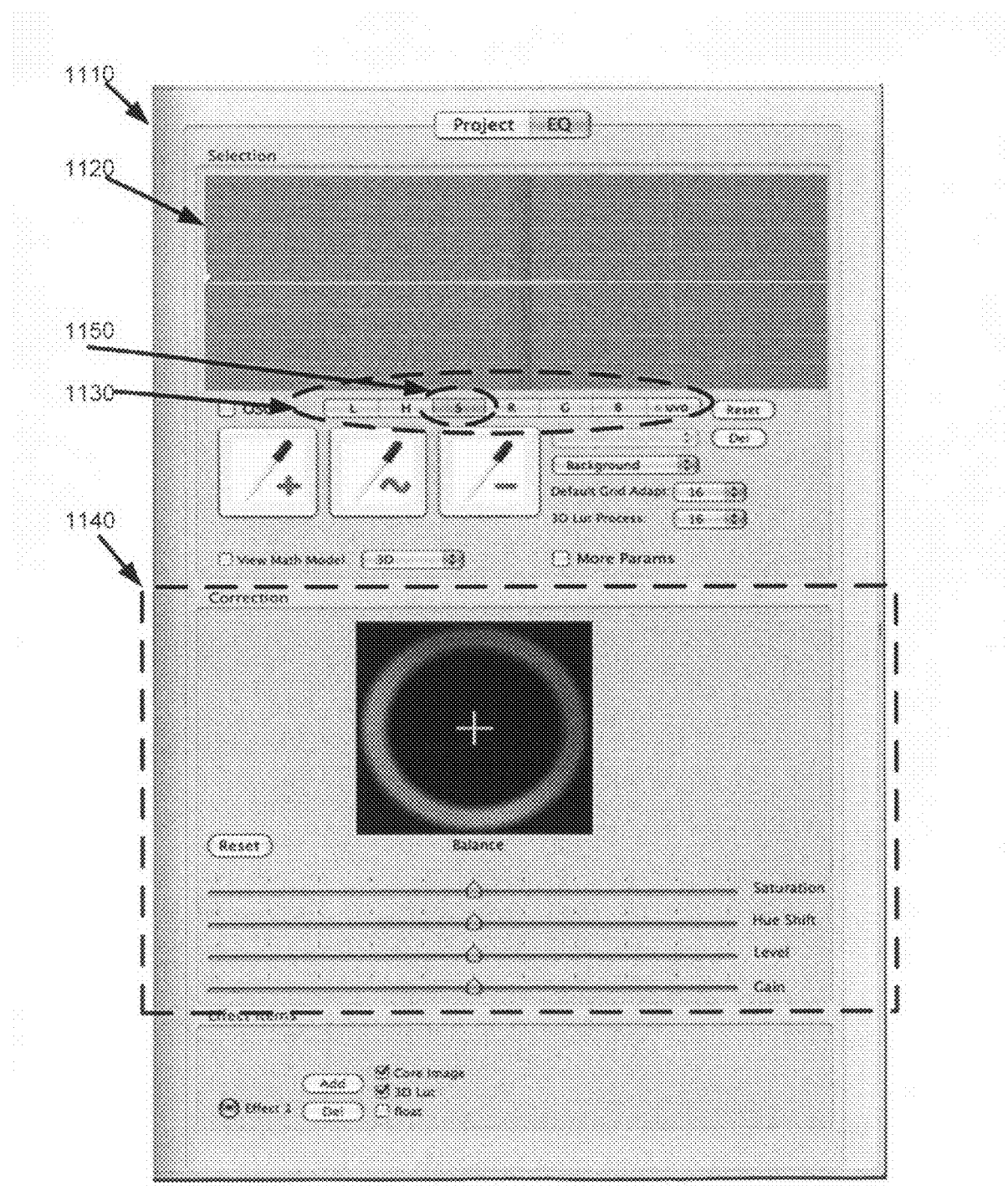
FIG. 11 presents a media editing interface for performing relative adjustments to color attributes of an image in accordance with some embodiments of the invention.

FIG. 11 presents a media editing interface 1110 for performing relative adjustments to color attributes of an image in accordance with some embodiments of the invention. The media editing interface 1110 includes: (1) a display area 1120, (2) a first set of selectable user interface items 1130, and (3) a second set of selectable user interface items 1140.

In some embodiments, the display area 1120 allows for the graphical adjustment of second color attribute values for a set of second image color attributes relative to one or more sets of first color attribute values for a first image color attribute. The first set of selectable user interface items 1130 select the first image color attribute. Specifically, from the selected first image color attribute, users specify sets of first color attribute values for pixels in an image over which to apply a color correction adjustment to one or more second color attributes. Users are able to select one of the luminance, hue, saturation, red color, green color, and blue color attributes as the first image color attribute. It should be apparent to one of ordinary skill in the art that the illustrated and enumerated color attributes of the media editing interface 1110 is an exemplary set of color attributes and that in some embodiments additional color attributes may be included with some or all the illustrated and enumerated color attributes. More specifically, any color attribute of any color model may be incorporated with the following description. For instance, the CMYK color model includes cyan, magenta, and yellow color attributes and the YCbCr color model includes luma, blue chorma, and red chroma color attributes that may be incorporated within the functionality of the media editing interface 1110.

The second set of selectable user interface items 1140 select the second set of image color attributes for adjustment. Specifically, users are able to select one or more of the color balance, saturation, hue, level, and gain color attributes as the one or more second image color attributes for adjustment. In some embodiments, some or all of the second set of items 1140 include individual control items for specifying an amount of adjustment for a corresponding second color attribute. For instance, the control items for the saturation, hue, level, and gain color attributes are shown as slider control items. However, it should be apparent to one of ordinary skill in the art that any number of control items may be used to specify a second color attribute adjustment value, such as a text box, drop down box, or radial control as some examples.

A. Specifying the Relative Adjustment

Users specify a relative adjustment by identifying pixels in an image for adjustment. To identify the pixels, users select one or more first color attribute values for adjustment. After a user selects the first color attribute values, the media editing interface identifies the pixels of the image that contain first color attribute values falling within the selected values. Thereafter, adjustments made to the set of second image color attributes will be applied to the identified pixels having the selected first color attribute values.

In some embodiments, users select the one or more first color attribute values by directly selecting pixels of an image having the first color attribute values. In other words, users select one or more pixels within the image and the corresponding first color attribute values are automatically identified within the display area of media editing interface of some embodiments.

To facilitate such functionality, some embodiments of the media editing interface generate a mapping for the color attribute values of each color attribute appearing within the image. The mapping then translates a pixel's color attribute value to a point along the graphical representation.

Figure 12:
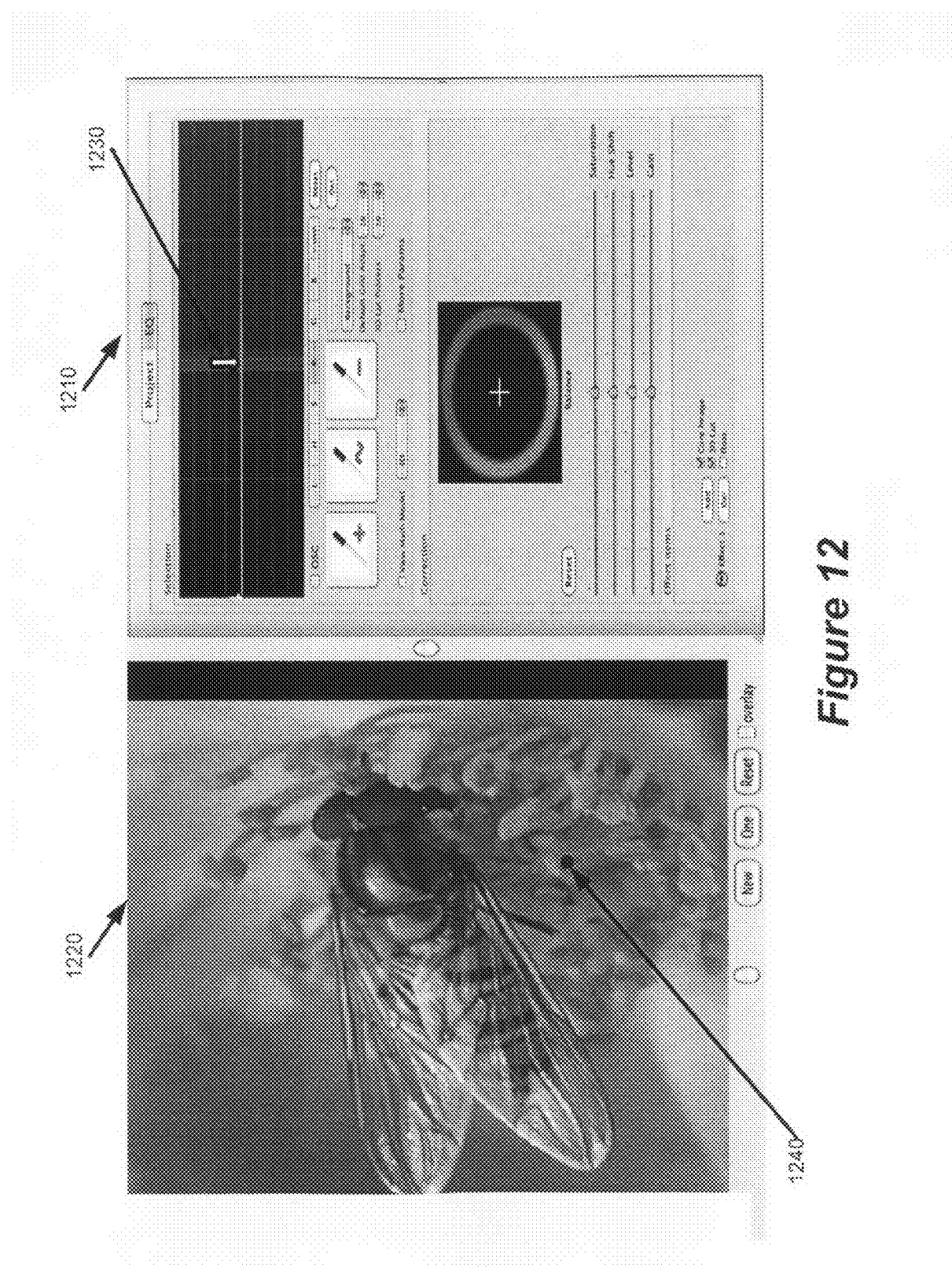
FIG. 12 illustrates selecting a first color attribute value by directly interacting with an image.

FIG. 12 illustrates selecting a first color attribute value by directly interacting with an image. In this figure, the media editing interface 1210 of some embodiments is shown adjacent to a display window 1220 of a media editing application. The display window 1220 renders the image and updates the rendered image to reflect the adjustments specified through the media editing interface 1210.

Users interact with the display window 1220 to select a desired first color attribute value. To select a particular first color attribute value, the user clicks on any pixel of the image using a graphical interface selection tool such as a mouse cursor or touchpad. The first color attribute value of the selected pixel is then highlighted in the display area of the media editing interface 1210 with an arrow. In this figure, the selected first color attribute is the red color channel. The user selects pixel 1240 of the image having a particular red color channel color attribute value that falls into a bounded range of intensity. The media editing interface 1210 identifies the selected red color channel color attribute value of the pixel 1240 within the display area of the media editing interface 1210 using the arrow 1230.

Figure 13:
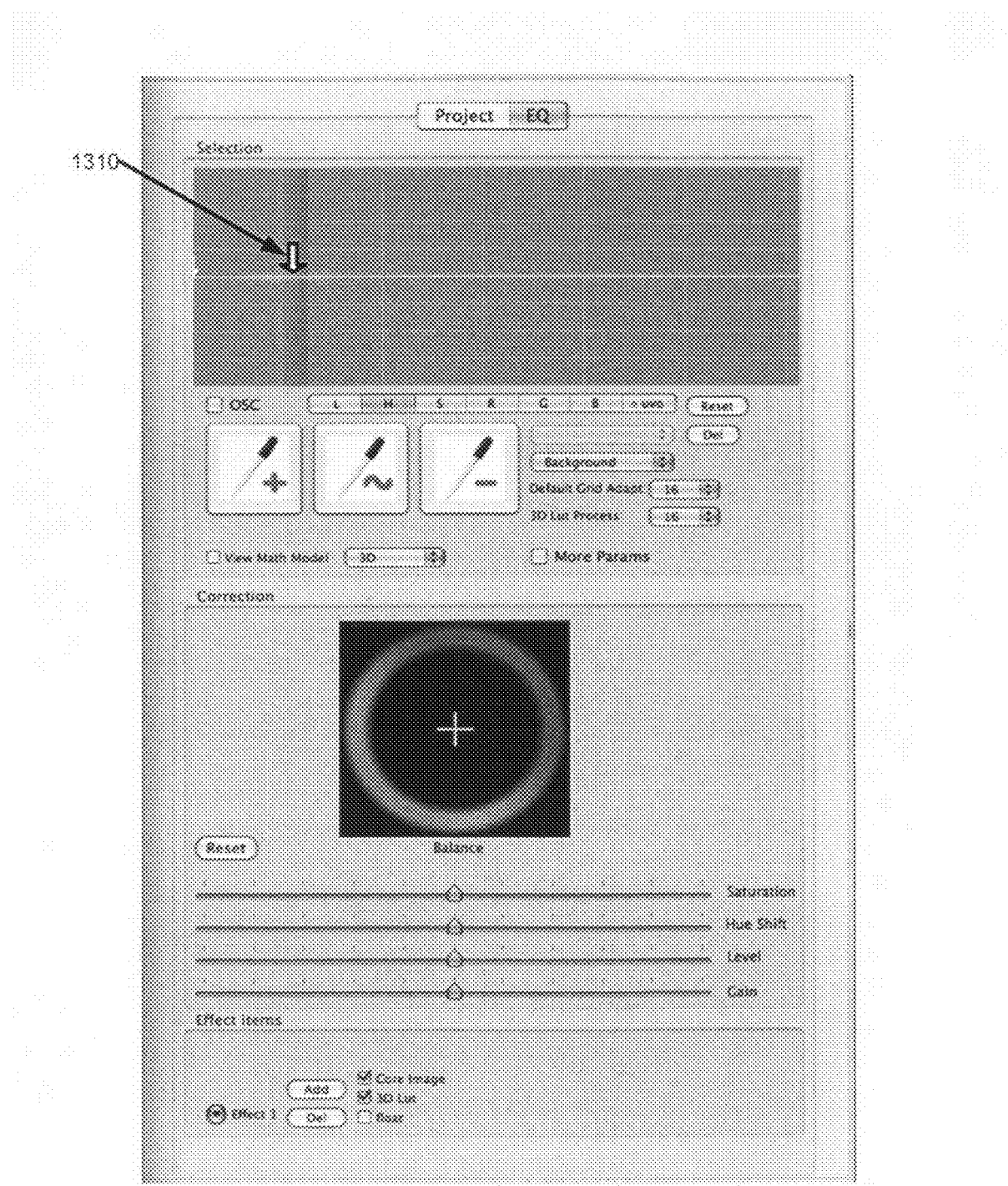
FIG. 13 illustrates a first color attribute value for the selected pixel of the image of FIG. 12 displayed on a different first color attribute than illustrated in FIG. 12.

FIG. 13 illustrates the first color attribute value for the selected pixel of the image of FIG. 12 displayed on a different first color attribute than illustrated in FIG. 12. In FIG. 12, when the user selects pixel 1240 of the image, the first color attribute value identified is the red color channel value of the selected pixel. In FIG. 13, the first color attribute value identified 1310 is the hue color attribute value for the selected pixel 1240. In this manner, the user can identify any first color attribute value for any pixel in the image by simply selecting the pixel within the image. Users may then interact with the graphical representation of the display area to specify additional similar first color attribute values surrounding a particular first color attribute value as discussed below.

In some embodiments, users select the first color attribute values by directly interacting with the display area of the media editing interface. Specifically, the display area of the media editing interface includes at least one graph that maps first color attribute values along a first horizontal axis and a set of second color attribute values along a second vertical axis of the display area. A user then selects one or more first color attribute values by clicking and dragging the graphs at one or more desired first color attribute values along the horizontal first color attribute axis.

Figure 14:
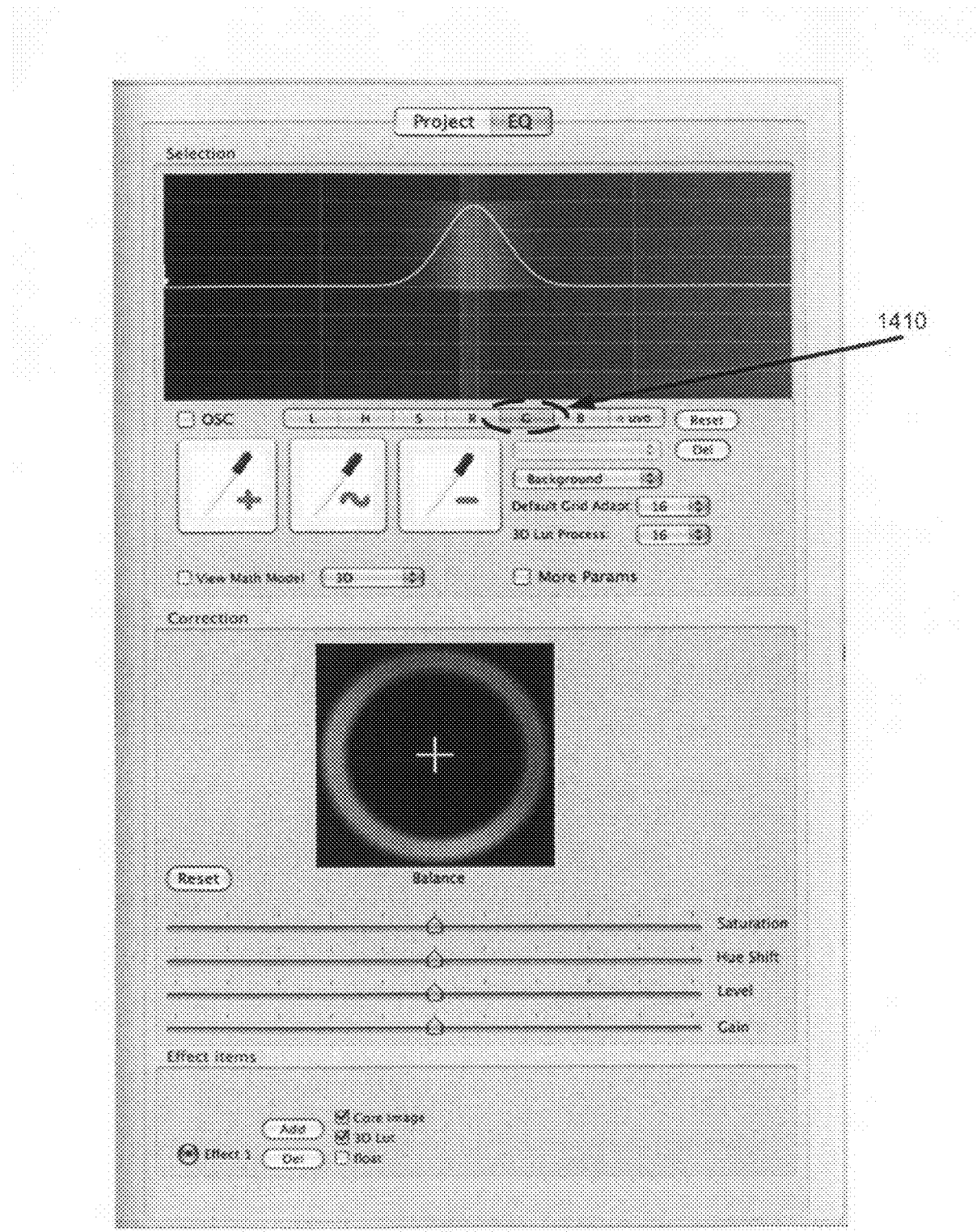
FIG. 14 illustrates the media editing interface with the green color channel color attribute selected for representation along the horizontal axis of the graph.

Referring back to FIG. 11, different graphs are provided for each of the selectable first color attributes 1130. When a different first color attribute item 1130 is selected, the display area 1120 of the media editing interface 1110 changes to reflect the range of values for the selected first color attribute. For instance, in FIG. 11, the saturation color attribute 1150 is selected for the first color attribute. As a result, the display area 1120 graphically displays the complete range of saturation color attribute values. Alternatively, FIG. 14 illustrates the media editing interface with the green color channel color attribute 1410 selected for representation along the horizontal axis of the graph. In this manner, users are able to specify a color correction adjustment that involves multiple different combinations of relative color attribute adjustments through a single control interface.

In some embodiments, the range of values for the first color attribute displayed within the display area includes those values that are found within the image. For example, the image may only specify green channel color attribute values between 30 and 210 for an 8 bit color model that specifies green channel color attribute values of 0 to 255. In this example, the first color attribute values spanning the horizontal axis of the display area range from 30 to 210 instead of 0 to 255. In other embodiments, the range of values for the first color attribute displayed within the display area includes those values that are found within a particular color model (e.g., the hue, saturation, value (HSV) color model, hue saturation, lightness (HSL) color model, RGB color model, etc.). Using the above example, the first color attribute values spanning the horizontal axis of the display area range from 0 to 255.

It should be apparent to one of ordinary skill in the art that values spanning either the horizontal or vertical axes of the display area may vary depending on the range of values selected to represent the color attribute. For instance, rather than limit the range of red color values to be between values of a particular bit depth, some embodiments utilize the virtually unlimited range of fractional values that fall between the values of 0 and 1 (i.e., a float type). In this manner, some embodiments operate over multiple different devices each with different capabilities for rendering and modifying the color attributes of an image.

Figure 15:
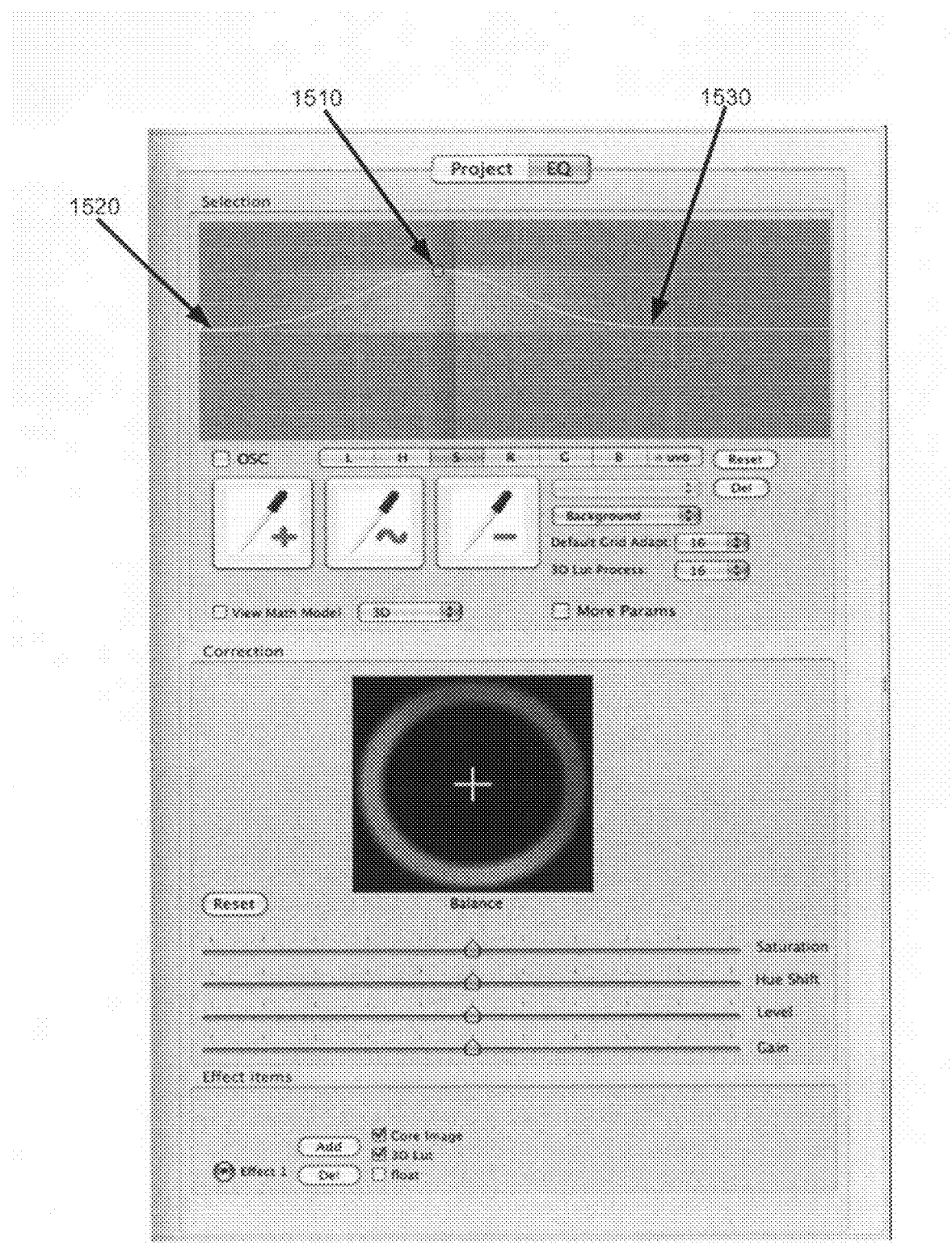
FIG. 15 presents the display area of FIG. 11 after the graph representing a first color attribute relative to one or more second color attributes is adjusted.

FIG. 15 presents the display area of FIG. 11 after the graph representing a first color attribute relative to one or more second color attributes is adjusted. The adjustment to the graph results from a user selecting point 1510 of the graph and dragging the point 1510 upwards. In so doing, the user identifies all pixels of an image having first color attribute values falling between the range 1520 to 1530 for adjustment.

After specifying a set of one or more first color attribute values, the user then specifies an amount by which to modify one or more second color attribute values relative to the set of pixels identified from the specified set of first color attribute values. Some embodiments permit users the ability to specify the amount of the second color attribute adjustments in any number of ways. For example, by increasing or decreasing the amplitude for the selected range of first color attribute values, the user specifies a relative amount of increase or decrease to the values of the selected second color attributes. The higher the second color attribute values for a specified range of first color attribute values in the graph, the greater the increase to the second color attribute values for pixels within the specified range. Similarly, the lower the second color attribute values for a specified range of first color attribute values in the graph, the greater the decrease to the second color attribute values for pixels within the specified range.

Initially, the graphs are flat horizontal lines along a "0" value of the vertical axis. To produce such a graph, some embodiments normalize the default second color attribute values of an image. The default second color attribute values represent values for the second color attribute as they exist within an unmodified image. The normalization of the values provides a uniform representation for the second color attribute irrespective of the actual default values appearing throughout the image. In other words, the second color attribute values represented by the vertical axis represent a percentage deviation from default values of the original image, where a "0" value indicates that value has not changed. Alternatively, the second color attribute values represented by the vertical axis represent an intensity amplification or deamplification for the second color attribute relative to its default value in an original unmodified image. In this manner, a particular pair of horizontal and vertical coordinates is able to represent second color attribute values for one or more pixels of the image, where the one or more pixels may specify different second color attribute values.

An example will now be given for further clarification. In this example, the first color attribute (i.e., horizontal axis) represents red color attribute values and the second color attribute (i.e., vertical axis) represents saturation color attribute values. There are three different pixels within an image with a first red color attribute value of 100. A first such pixel has a second color attribute saturation value of 25, a second such pixel has a second color attribute saturation value of 60, and a third such pixel has a second color attribute saturation value of 90. In the graph presented in the display area of some embodiments, all three pixels are presented as a single point along the horizontal axis since all three pixels share the same red color attribute value. Additionally, all three pixels are normalized and presented as a single point along vertical position because the vertical axis represents an amount of adjustment to amplify or deamplify the pixel's original saturation values. A normalized flat "0" point indicates that the saturation values have not deviated from the original saturation values. However, if the point is located above the "0" vertical axis, then the point indicates that the saturation intensity for all three pixels has been amplified by a similar amount (e.g., 10%).

Figure 16:
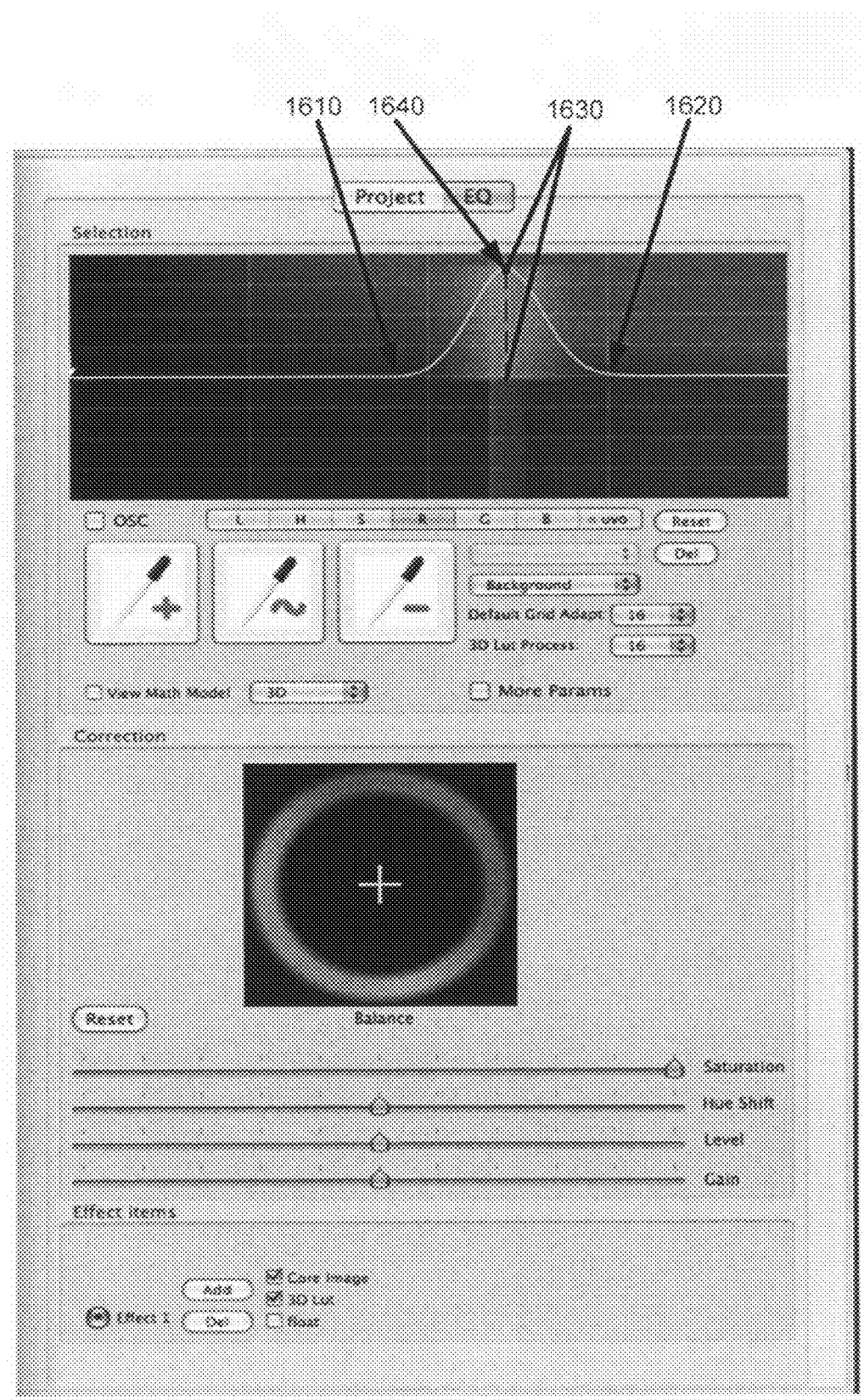
FIG. 16 illustrates specifying an increase to the saturation color attribute of an image through a display area of a media editing interface of some embodiments.
Figure 17:
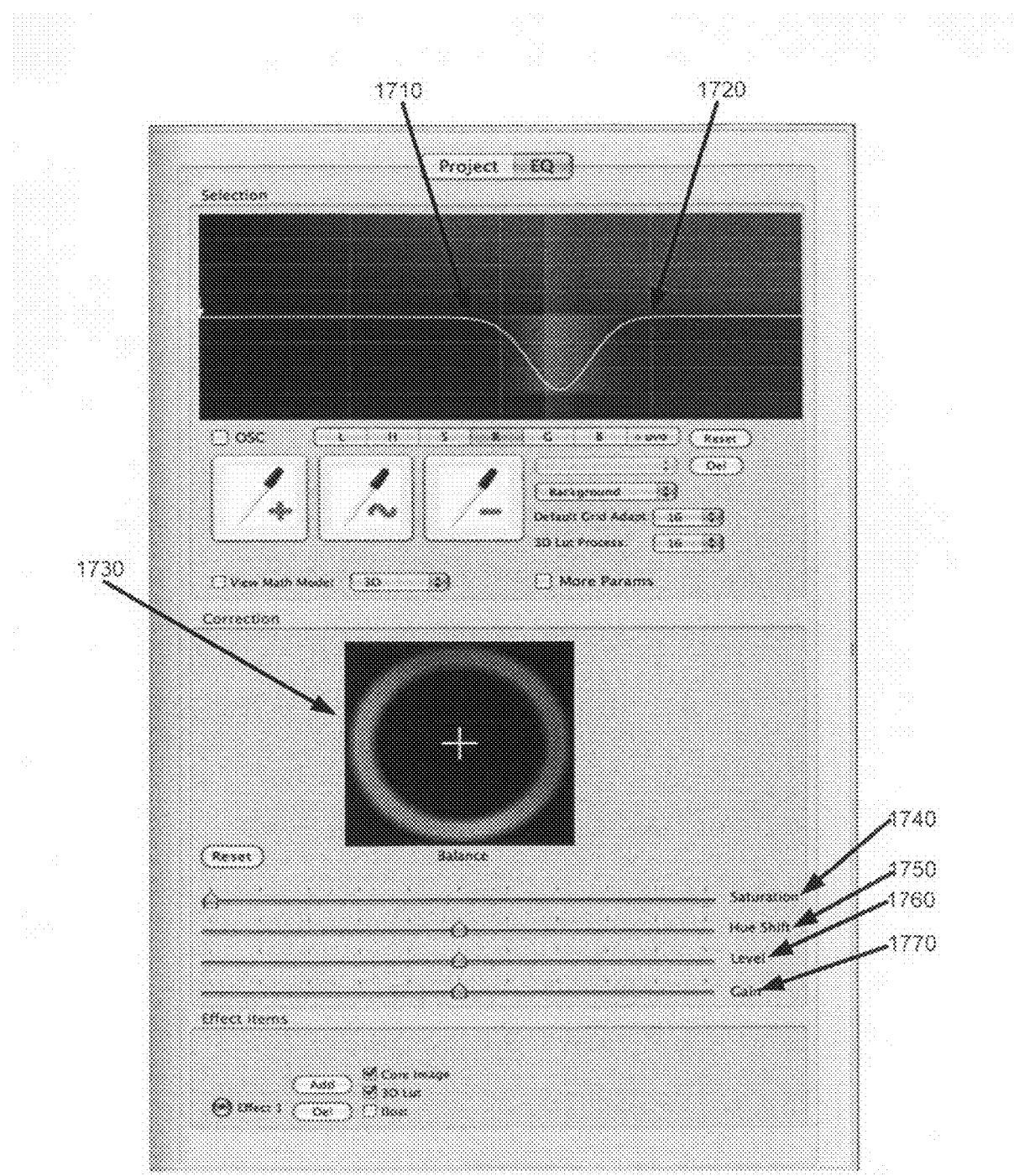
FIG. 17 illustrates specifying a decrease to the saturation color attribute of an image through the display area of the media editing application.

FIG. 16 illustrates specifying an increase to the saturation color attribute of an image through a display area of a media editing interface of some embodiments. In this figure, the height 1630 of the graph specifies a particular amount by which to increase the saturation levels for pixels having red color channel values within the range of values 1610 to 1620. FIG. 17 illustrates specifying a decrease to the saturation color attribute of an image through the display area of the media editing application. In this figure, the amplitude of the graph falls below the "0" vertical axis line and thus specifies a particular amount by which to decrease the saturation color attribute for pixels having red color channel values within the range of values 1710 to 1720. Different graph adjustment tools for modifying the graph are discussed in further detail in Section III below.

In conjunction with or instead of using the amplitude of the graph to specify the amount of second color attribute adjustment, some embodiments specify an amount for the second color attribute adjustment through the control items associated with each of the selectable second color attribute items. As shown in FIG. 17, the selectable second color attribute items include a color balance wheel 1730, a saturation slider control item 1740, a hue shift slider control item 1750, a level slider control item 1760, and a gain slider control item 1770. By manipulating one or more of these items, a user is able to specify an amount by which to increase second color attribute values for pixels that have first color attribute values falling within the specified range 1710 to 1720 of values.

Initially, each of the color balance wheel 1730 and slider control items 1740-1770 are centered within their respective controls. The center point of a control 1730-1770 reflects the value for each corresponding second color attribute as it exists within an original unmodified image. An amount of increase or decrease to the values for the corresponding second color attributes is determined by the distance from the center point. The greater the distance the greater the increase or decrease to the values. For example, in FIG. 17, the far left most position of the saturation slider control item 1740 specifies a desaturation distribution over the pixels of the image within the range of first color attribute values 1710 to 1720, with the center point in the distribution being fully desaturated.

Figure 18:
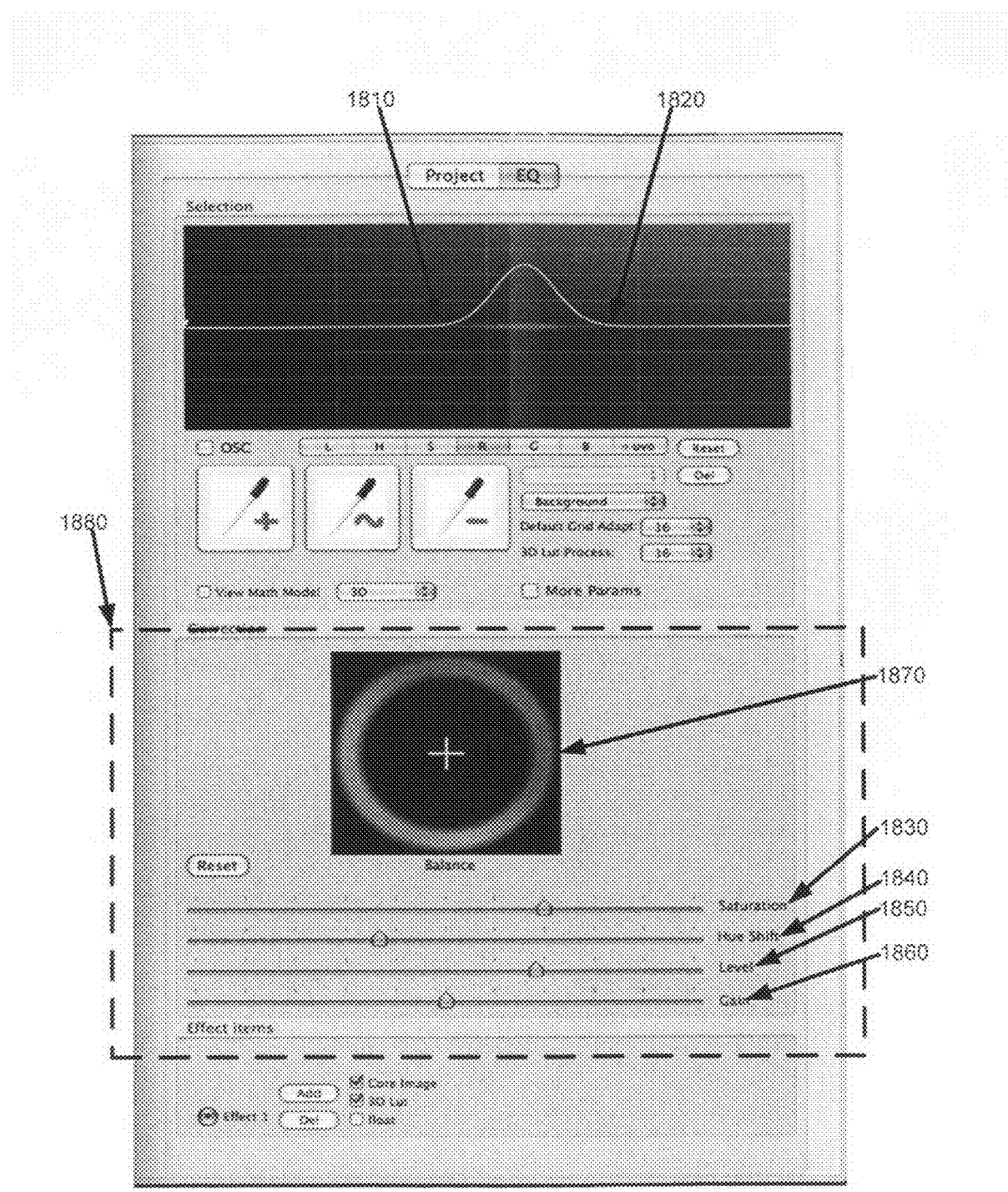
FIG. 18 illustrates specifying multiple second color attribute adjustments for a given range of first color attribute values.

Additionally, by manipulating two or more of the second color attribute controls, a user is able to simultaneously adjust two separate second image color attributes through a single display area of some embodiments. FIG. 18 illustrates specifying multiple second color attribute adjustments for a given range of first color attribute values. In this figure, the display area of the media editing interface specifies adjusting pixels having first color attribute values within the range 1810 and 1820. Three different second color attribute adjustments are specified for those pixels. Specifically, a user has specified increasing the saturation color attribute 1830, shifting the hue color attribute 1840, increasing the level color attribute 1850, and holding the gain 1860 and color balance 1870 color attributes unchanged for the pixels within the first color attribute range 1810 to 1820.

It should be apparent to one of ordinary skill in the art that some embodiments of the media editing interface provide different mechanisms by which to specify the amount of second color attribute adjustment. First, the amplitude of the graphs appearing within the display area. Second, the corresponding controls associated with each of the second color attribute items. Therefore, a first amount of adjustment specified via a control item can be further increased by an increase to the amplitude of the graph or decreased by reducing the amplitude of the graph. Similarly, a first amount of adjustment specified by an amplitude of the graph can be further increased by moving a slider control item to the right or decreased by moving the slider control item to the left. Accordingly, in some embodiments, the two mechanisms complement the functionality of one another while in other embodiments the two mechanisms operate independent of one another.

B. Alternate Relative Adjustments

In the above enumerated figures, users specify one or more second color attribute adjustments relative to a single selected set of first color attribute values. However, some other embodiments of the media editing interface provide alternate means by which to specify and modify the one or more second color attribute adjustments relative to a first color attribute. Specifically, in some such embodiments, the media editing interface permits users the ability to specify a different set of first color attribute values for each second color attribute being adjusted in the display area.

Figure 19:
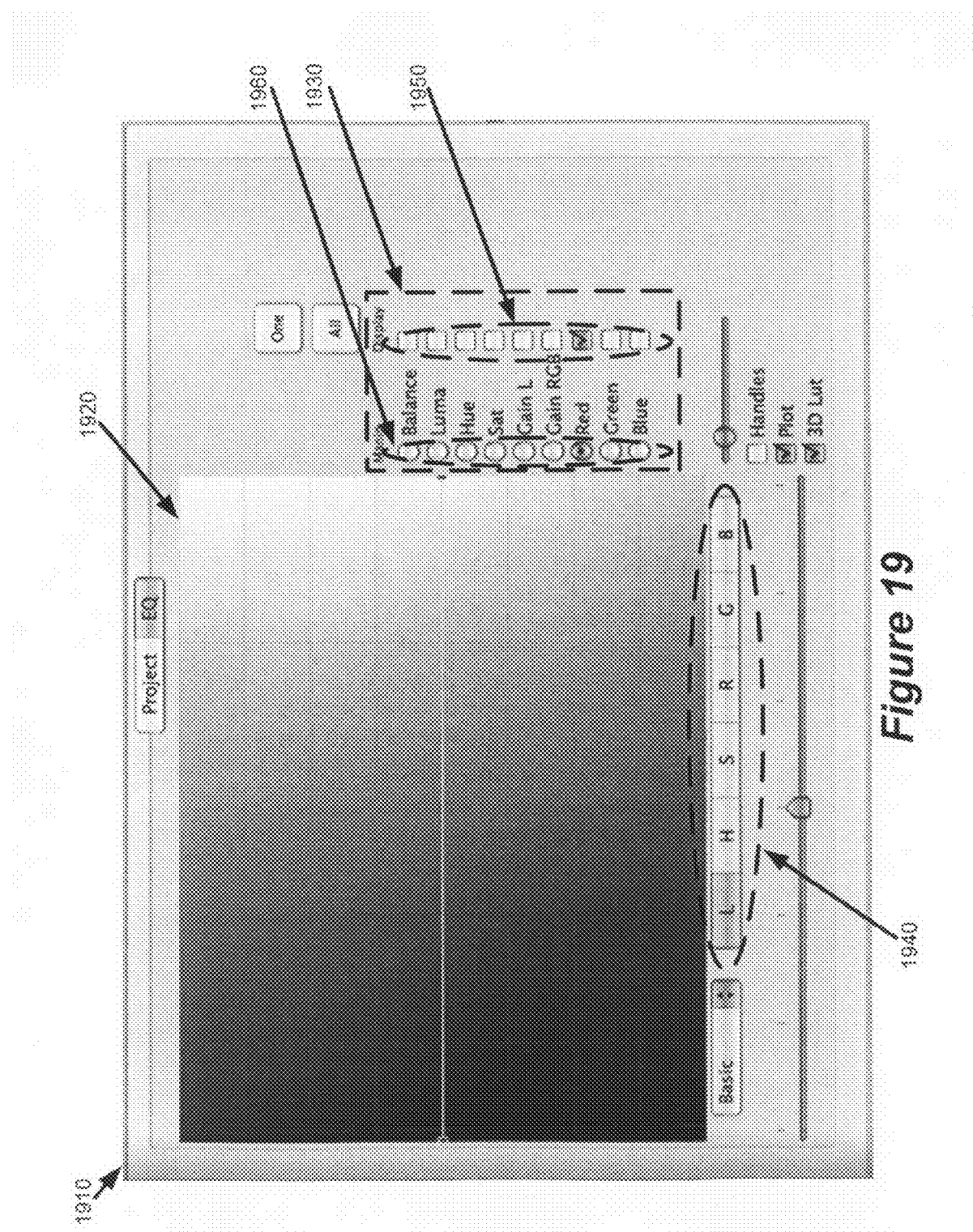
FIG. 19 presents an alternative media editing interface by which to specify a different set of first color attribute values for each second color attribute being adjusted.

FIG. 19 presents an alternative media editing interface 1910 by which to specify a different set of first color attribute values for each second color attribute being adjusted. Users define the one or more second color attributes for the vertical axis of the display area 1920 by selecting one or more of the user interface check box items 1950 of the second set of items 1930. Users define the first color attribute along the horizontal axis of the display area 1920 by selecting one of the selectable first set of items 1940.

For each user interface check box item 1950 selected, a graph appears within the display area 1920 to represent the selected second color attribute relative to the selected first color attribute. The selectable user interface items 1960 of the media editing interface 1910 specify which graph or second color attribute of the image to modify from the one or more graphs or second color attributes selected through the checkbox items 1950. In this manner, a user is able to specify a particular set of first color attribute values over which to adjust a particular second color attribute and a different set of first color attribute values over which to adjust a different second color attribute.

Figure 20:
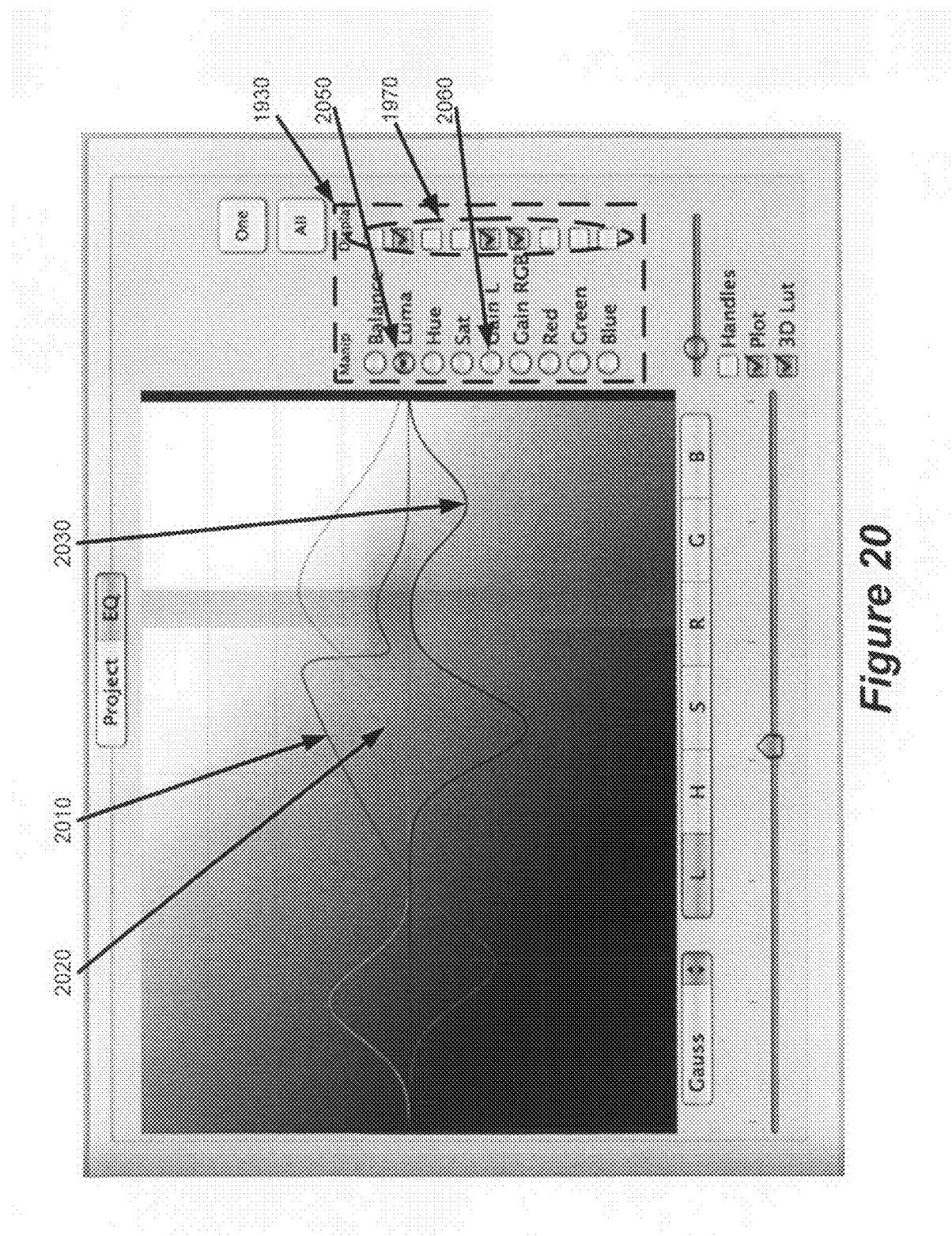
FIG. 20 illustrates the display area of the media editing interface after several different second color attributes are selected for display through the selectable checkbox items of the second set of items.

FIG. 20 illustrates the display area of the media editing interface after several different second color attributes are selected for display through the selectable checkbox items 1950 of the set of items 1930. In FIG. 20, three graphs are illustrated: a first graph 2010 for representing the luminance as the second color attribute, a second graph 2020 for representing the gain for lightness as the second color attribute, and a third graph 2030 for representing the gain for RGB color channels as the second color attribute. Since the user interface item 2050 for the luminance color attribute is selected, only the luminance graph 2010 within the display area is editable. This simplifies the editing of the graphs as a user is only able to modify one such graph at any given. To modify the gain lightness graph 2020, a user simply selects the user interface item 2060 causing the gain lightness graph 2020 to become editable. Thereafter, even though the graphs for the other second color attributes are displayed, only the gain lightness 2020 is editable.

III. Graph Adjustment Tools

Some embodiments provide various graph adjustment tools that specify color corrections to the image by modifications to the graphs. The graph adjustment tool of some embodiments is a set of control points that allows users to adjust the graph where the graph is a deformable parameterized curve.

A. Control Points

In some embodiments, the set of control points are points that are associated with the graph. The control points may be associated with the graph in any number of ways. For example, the control points may include points on the graph or points off the graph. The control points allow users to deform the graphs and specify custom color correction adjustments to particular pixels of the image. Such functionality allows users to selectively modify particular tones, shadows, highlights, etc. appearing throughout the image.

In some embodiments, the graphs are formed by a set of piecewise polynomial curve, such as Bezier curves, that connect the control points. The curves are defined about the control points by a particular equation or set of equations. Accordingly, the curves or the equations defining the curves determine the shape of the graph and thus the color correction resulting from an adjustment to a particular control point.

Figure 21:
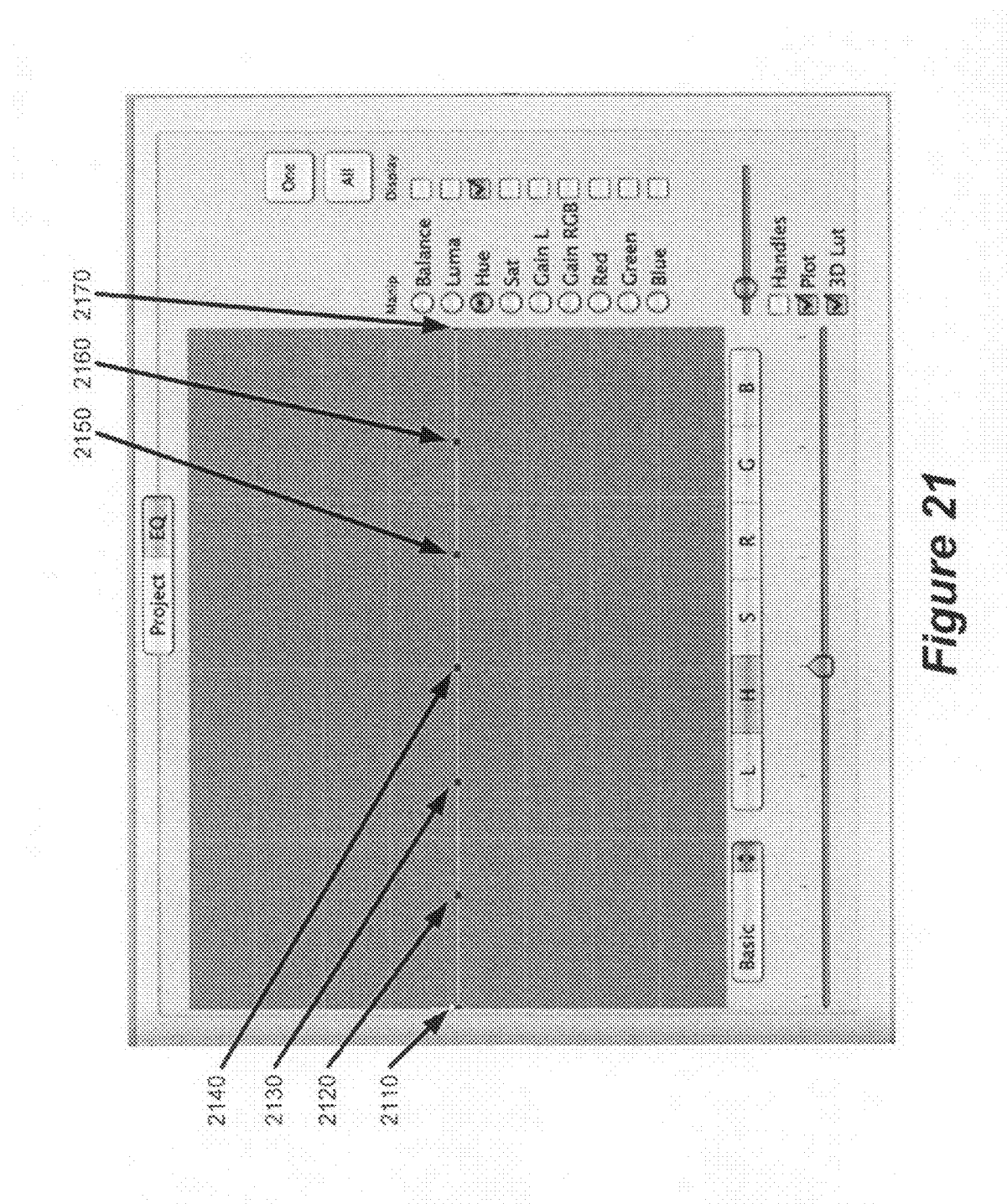
FIG. 21 illustrates control points along the graph that users may modify in order to specify different color correction adjustments.
Figure 22:
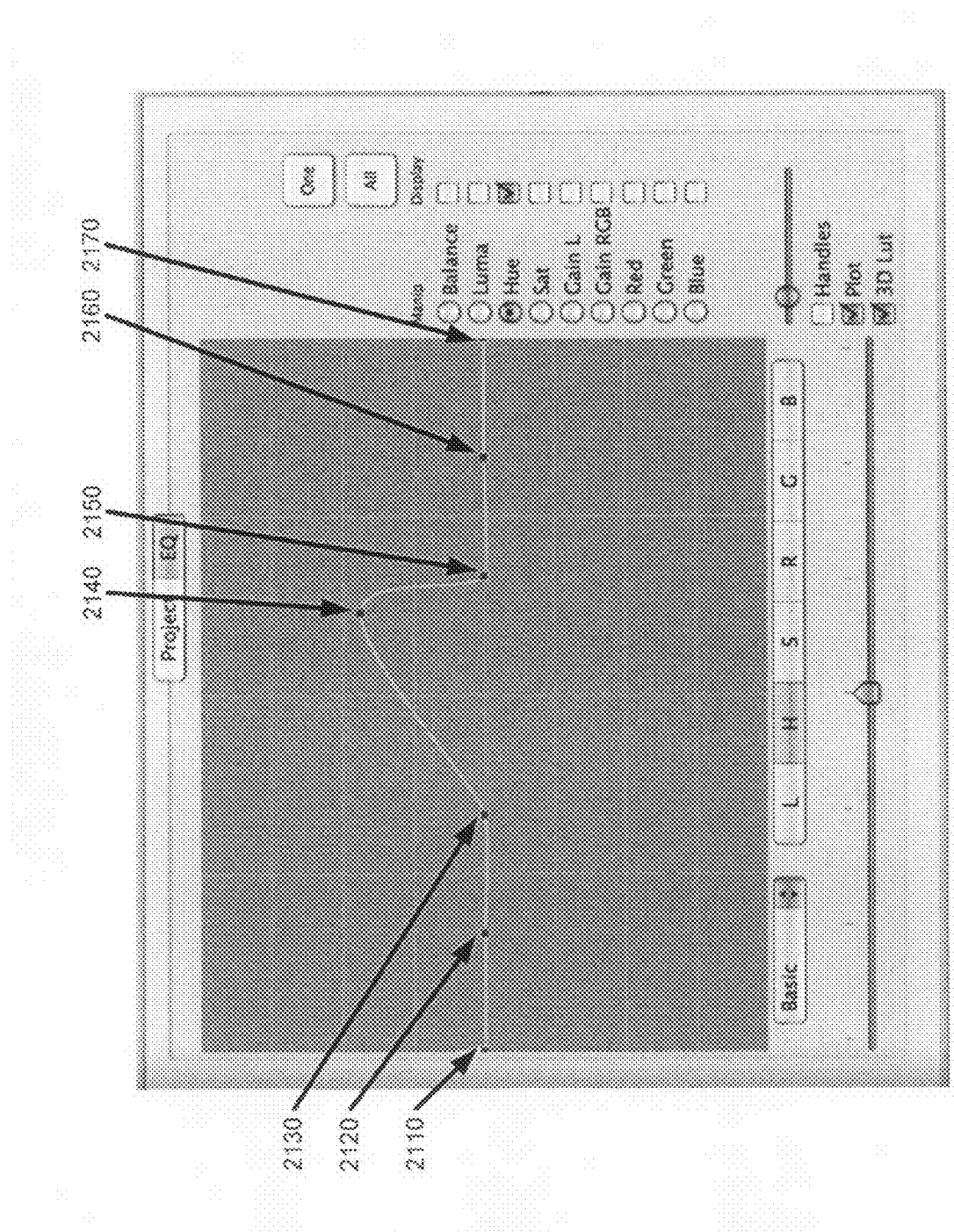
FIG. 22 illustrates specifying a color correction adjustment by modifying the position of the control point.

FIGS. 21-22 illustrate a color correction distribution based on a modification to a control point of a graph comprised of parameterized curves. FIG. 21 illustrates control points 2110-2170 along the graph that users may modify in order to specify different color correction adjustments. FIG. 22 illustrates specifying a color correction adjustment by modifying the position of the control point 2140. As evident in FIG. 22, the specified color correction adjustment is restricted to fall between control points 2130 and 2150 neighboring the adjusted control point 2140. Specifically, the distribution for the adjustment is defined by the parameterized curves that connect control point 2140 to 2130 and 2140 to 2150. The distribution specifies adjusting the second color attribute values (e.g., hue values) for pixels of the image with first color attribute values (e.g., hue values) falling within the range defined by control points 2130 and 2150.

If a user desires to increase the number of pixels affected by the color correction adjustment, the user either selects the control point 2130 and extends the control point 2130 horizontally away from control point 2140 or the user selects the control point 2150 and extends the control point 2150 horizontally away from control point 2140. Similarly, selecting and raising the control point 2150 has the effect of increasing second color attribute values for pixels within the range of first color attribute values defined by control points 2140 and 2160.

In some embodiments, additional control points may be introduced at any location along the graph by double clicking the desired location to generate the control point. In some embodiments, control points may be removed by clicking and dragging a first control point to a second control point. Once the first and second control points intersect, the first control point is removed from the graph. Therefore, by introducing, removing, and modifying control points, users are able to specify any number of custom color correction adjustments.

Figure 23:
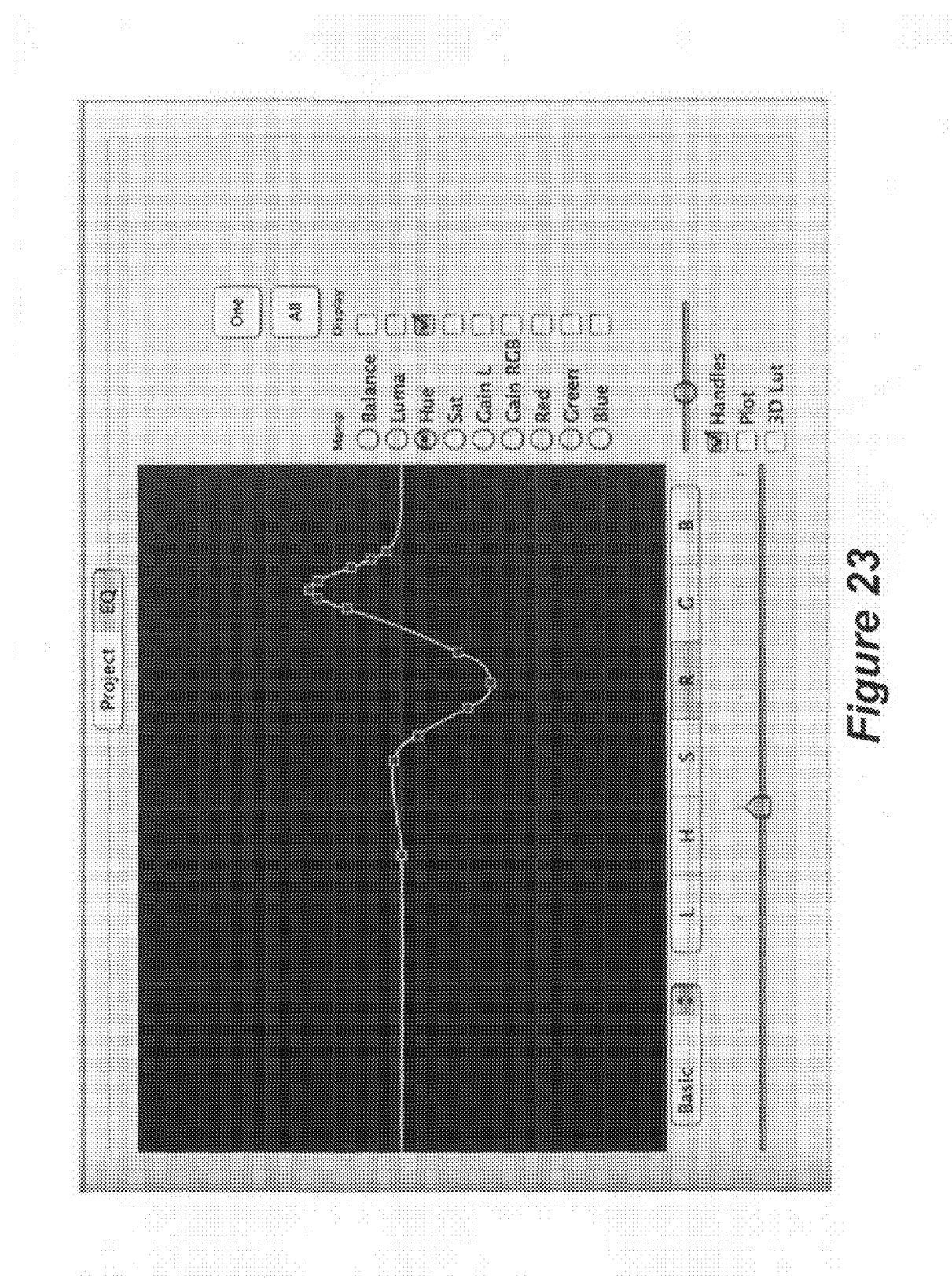
FIG. 23 illustrates control points along a graph.

Some embodiments provide modifiable tangent lines at the control points for further control over the color correction adjustment. To introduce the tangent lines, some embodiments provide a user interface item for selectively enabling and disabling the tangent lines. For instance, FIG. 23 illustrates control points along a graph and FIG. 24 illustrates the control points of FIG. 23 with the tangent lines enabled.

Figure 24:
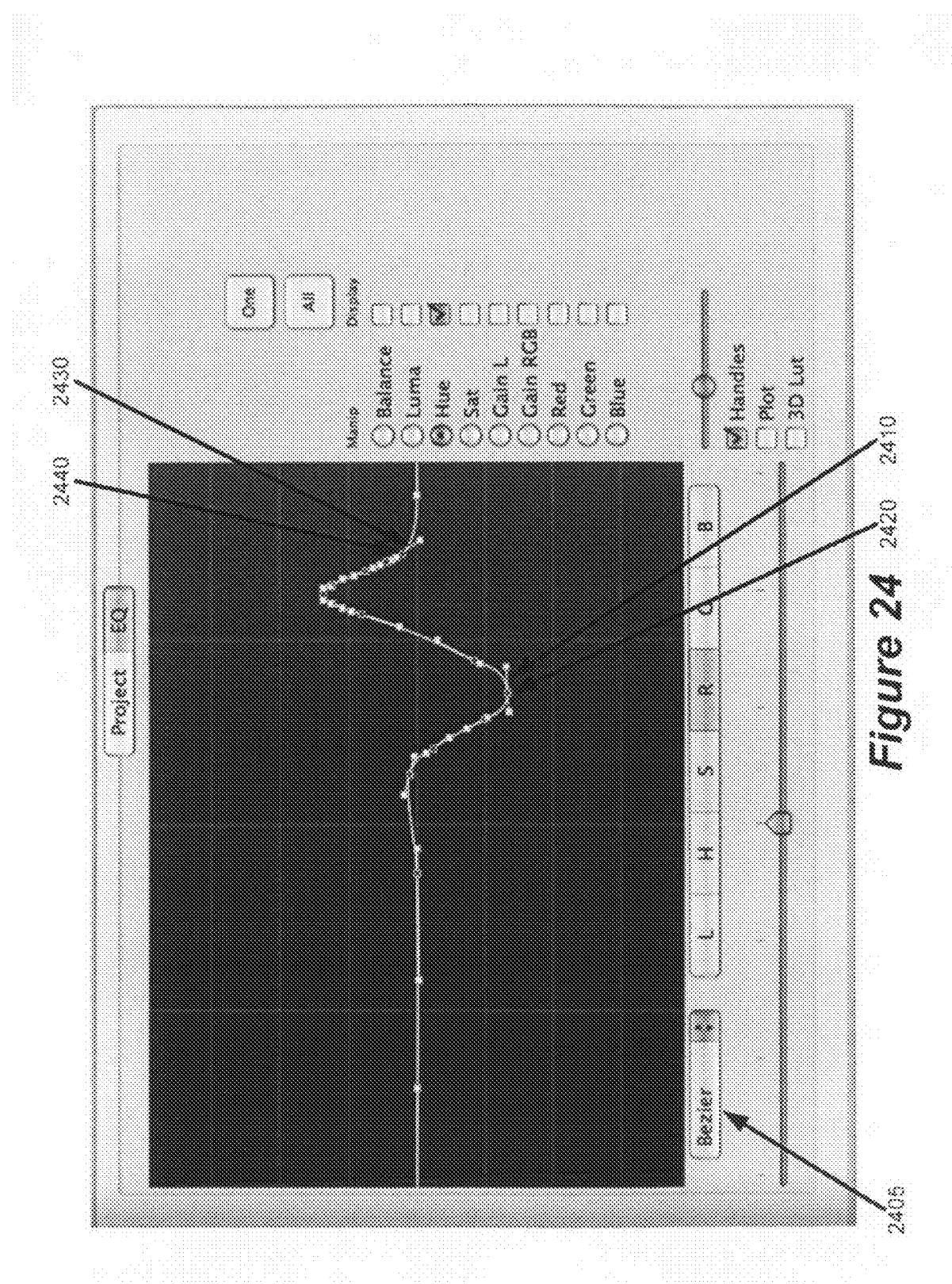
FIG. 24 illustrates the control points of FIG. 23 with the tangent lines enabled.
Figure 25:
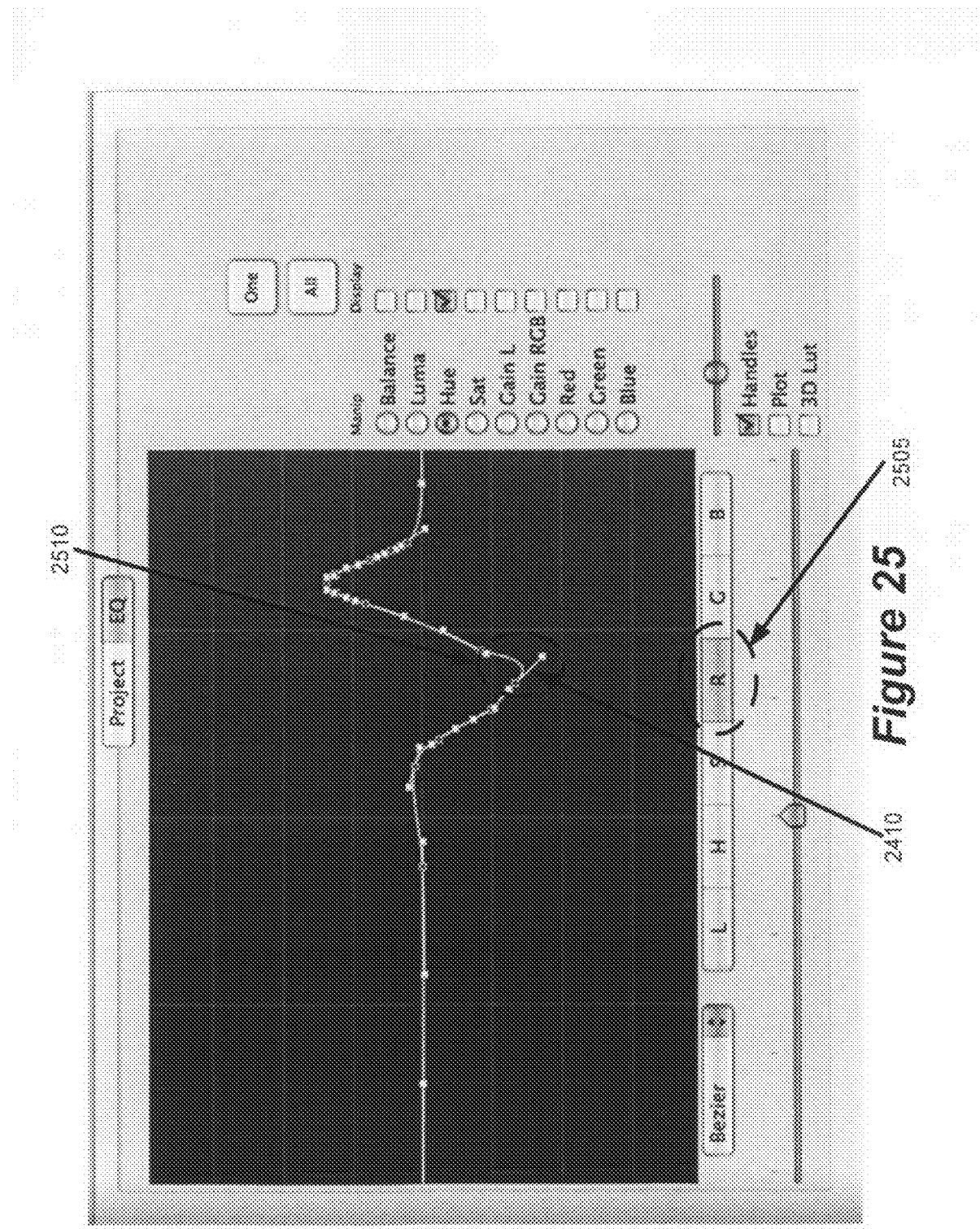
FIGS. 25 and 26 illustrate modifications to the tangent line and the resulting effect of each such modification.
Figure 26:
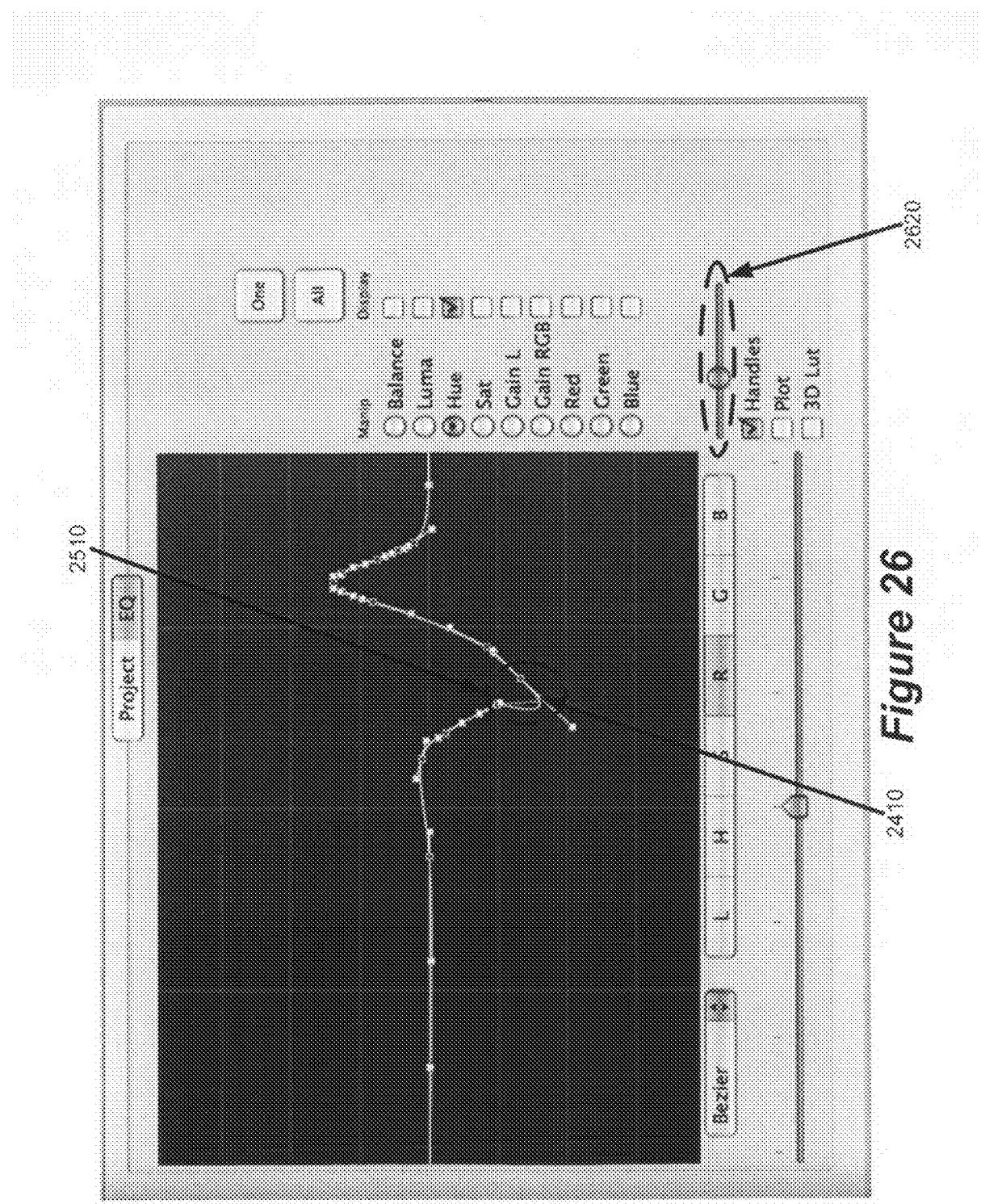

In FIG. 24, tangent line 2410 is provided to customize the color correction adjustment around the control point 2420 and tangent line 2430 is provided to customize the color correction adjustment around the control point 2440. FIGS. 25 and 26 illustrate modifications to the tangent line 2410 and the resulting effect of each such modification. In these figures, the distribution does not cross over the tangent line 2410. As a result in FIG. 25, the distribution is skewed such that the color attribute values at 2510 are distributed in a manner that does not conflict with the specified tangent line 2410. Similarly, in FIG. 26, the distribution is skewed such that the color attribute values at 2610 are distributed in a manner that does not conflict with the specified tangent line 2410.

Some embodiments allow further customized control over the tangent lines by modifying the length and thus the effect resulting from the tangent lines of the control points in determining the distribution. The slider user interface item 2620 provides the ability to modify the size of the tangent lines for the control points of the graph.

B. Gaussian Manipulator

The graph adjustment tool of some embodiments is a Gaussian manipulator for automatically producing smooth and blended color correction adjustments within the image. In some embodiments, the Gaussian manipulator operates over a rasterized curve representation of the graph. This allows the Gaussian manipulator to distribute a color correction adjustment over the graph according to a Gaussian distribution unlike the control points described above that restrict a color correction adjustment between neighboring control points.

The Gaussian manipulator may be used in conjunction with or independent of the control point graph adjustment tools. In this manner, users are able to specify color correction adjustments using the Gaussian manipulator that further modify adjustments specified by manipulations to the control points of a parameterized representation of the graph, if any such adjustments were previously specified.

To specify the Gaussian distribution, some embodiments display a graphical representation of the Gaussian manipulator over the graph. By modifying the shape of the graphical representation, users control parameters of the distribution such as the height of the Gaussian peak and width of the Gaussian bump. In other words, users control the amount of amplification or deamplification produced by the Gaussian distribution, the range of first color attribute values affected by the distribution, and the distribution itself.

Figure 27:
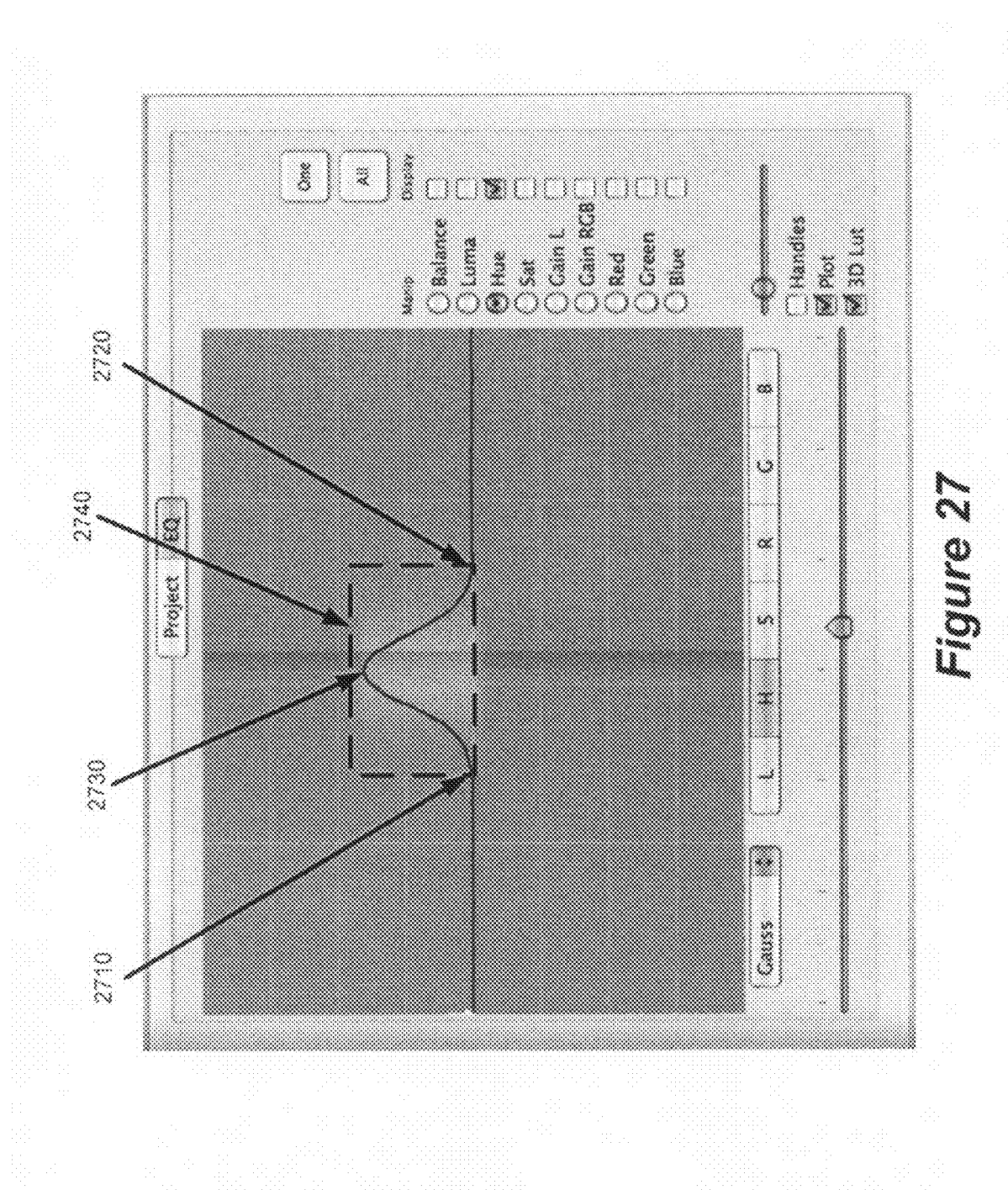
FIG. 27 presents a graph that is to increase hue color attribute values for pixels in an image having particular hue color attribute values.

FIGS. 27-32 illustrate various color correction distributions according to the Gaussian manipulator. In FIG. 27, the graph is modified to specify a hue shift for pixels in an image having hue values between 2710 and 2720. The hue shift for those pixels follows a Gaussian distribution where the amount of shift gradually decreases from the center point 2730 (i.e., the Gaussian peak) to points 2710 and 2720.

Figure 28:
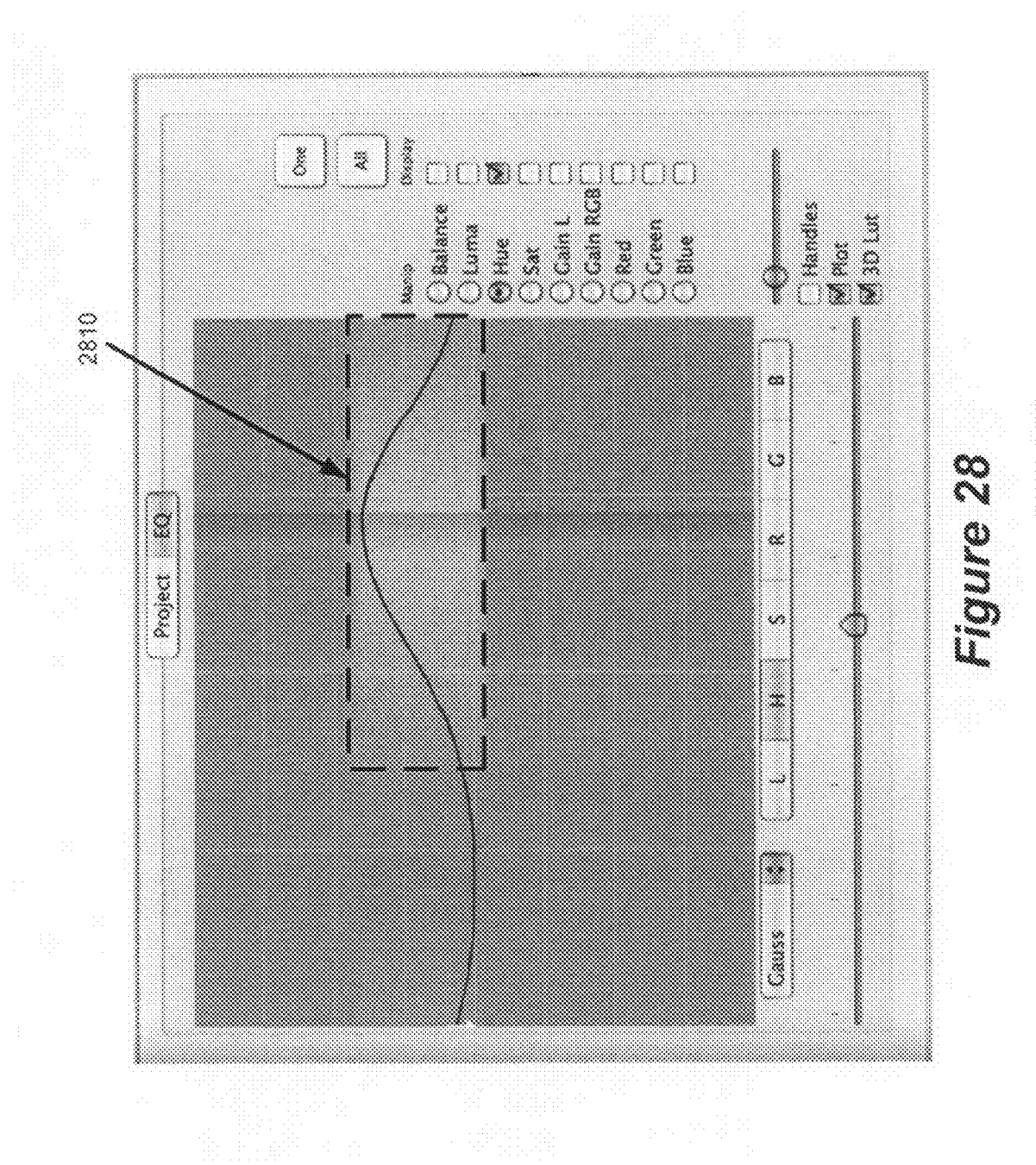
FIG. 28 illustrates extending the Gaussian bump of FIG. 27 along the horizontal axis such that the specified color correction adjustments is distributed across additional pixels of the image.
Figure 29:
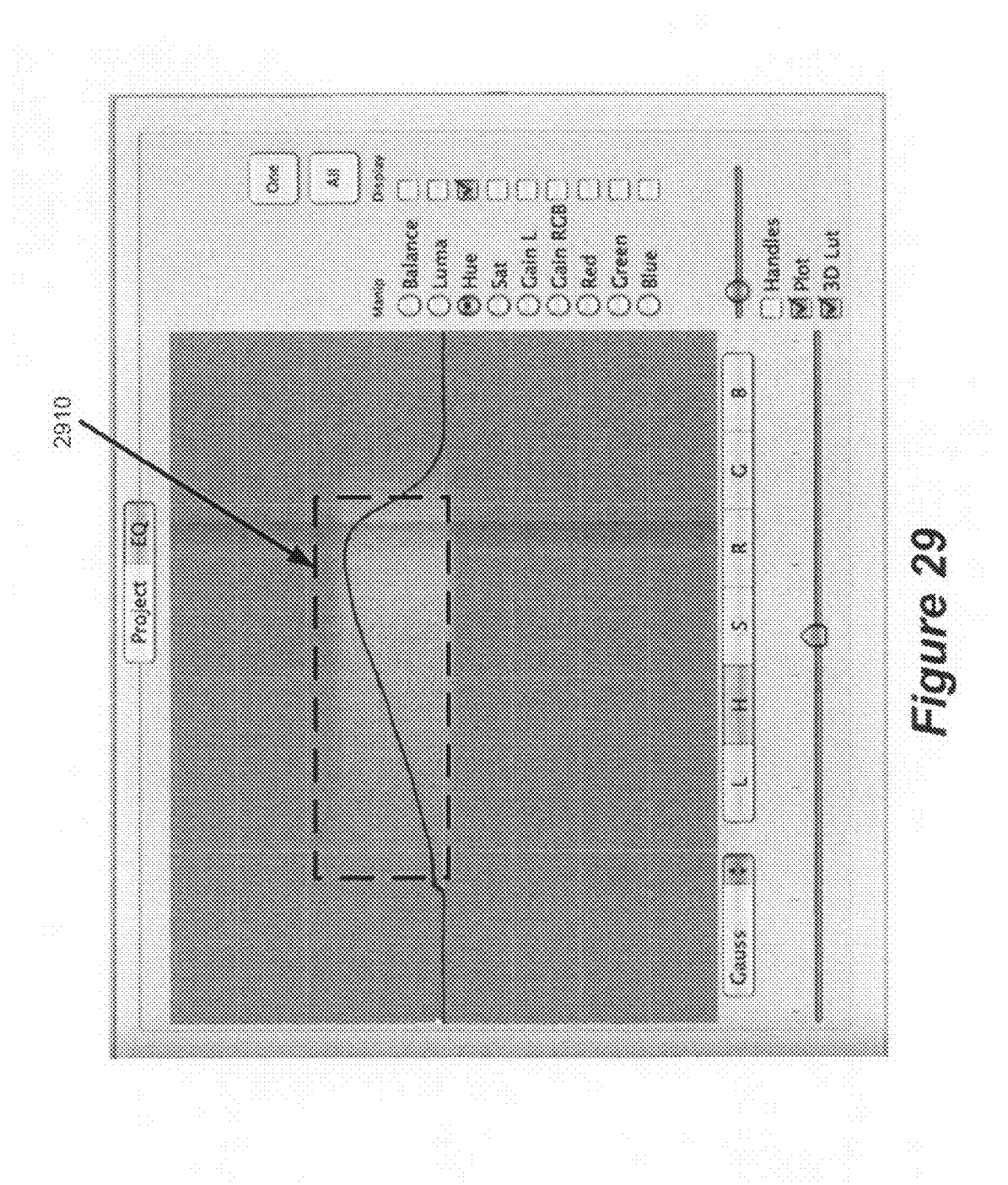
FIG. 29 illustrates extending one side of the Gaussian bump while the other side remains unaffected.
Figure 30:
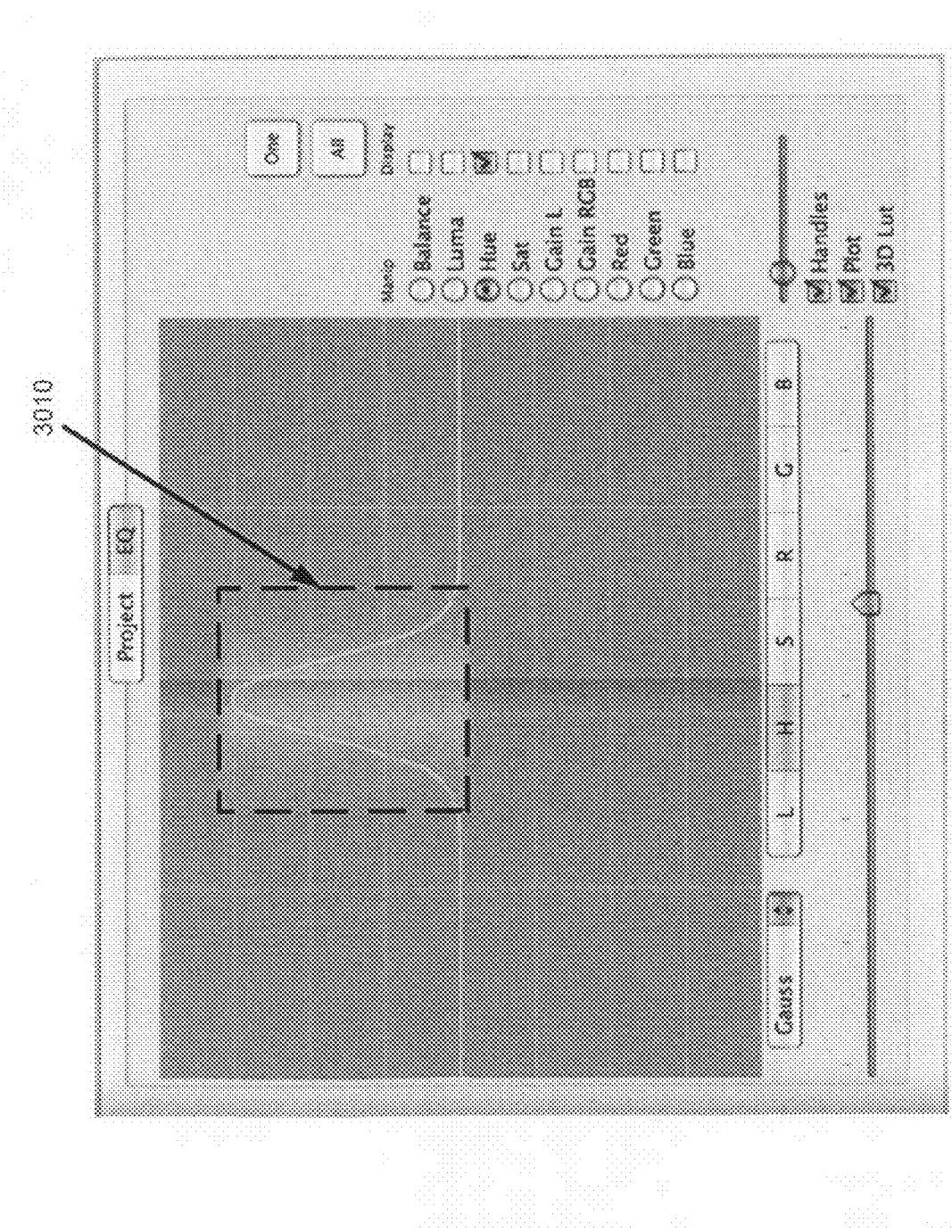
FIG. 30 illustrates extending the Gaussian bump of FIG. 27 along the vertical axis.

In some embodiments, users are able to modify the Gaussian distribution by manipulating the Gaussian bump. Such manipulations are performed by clicking and dragging the Gaussian bump to achieve the desired result. As shown in FIG. 27, the Gaussian bump is represented through the halo column 2740 displayed within the display area of the media editing interface. FIG. 28 illustrates extending the Gaussian bump of FIG. 27 along the horizontal axis such that the specified color correction adjustments is distributed across additional pixels of the image 2810. Through similar operations, some embodiments allow for the narrowing of the Gaussian bump and thus reducing the number of pixels affected by the color correction. Moreover, by performing a different set of user interface operations (i.e., mouse click while holding the control keyboard button), users are able to manipulate only one side of the Gaussian bump. For instance, FIG. 29 illustrates extending one side 2910 of the Gaussian bump while the other side remains unaffected. Similarly, users are able to extend the Gaussian bump along the vertical axis in order to increase the intensity of the color correction adjustment. For instance, FIG. 30 illustrates extending the Gaussian bump of FIG. 27 along the vertical axis 3010.

Figure 31:
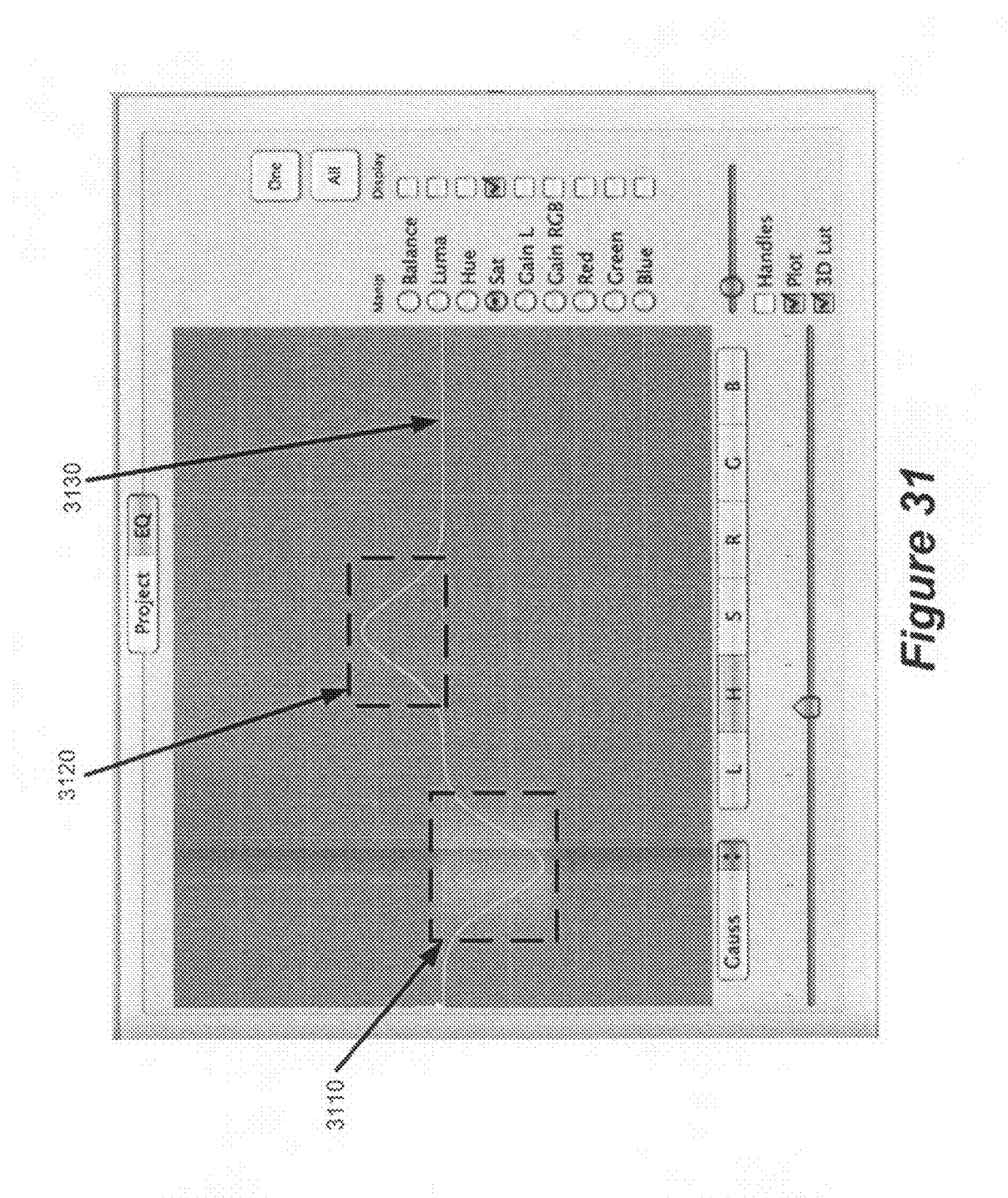
FIGS. 31 and 32 illustrate specifying multiple different Gaussian bumps over a single graph.
Figure 32:
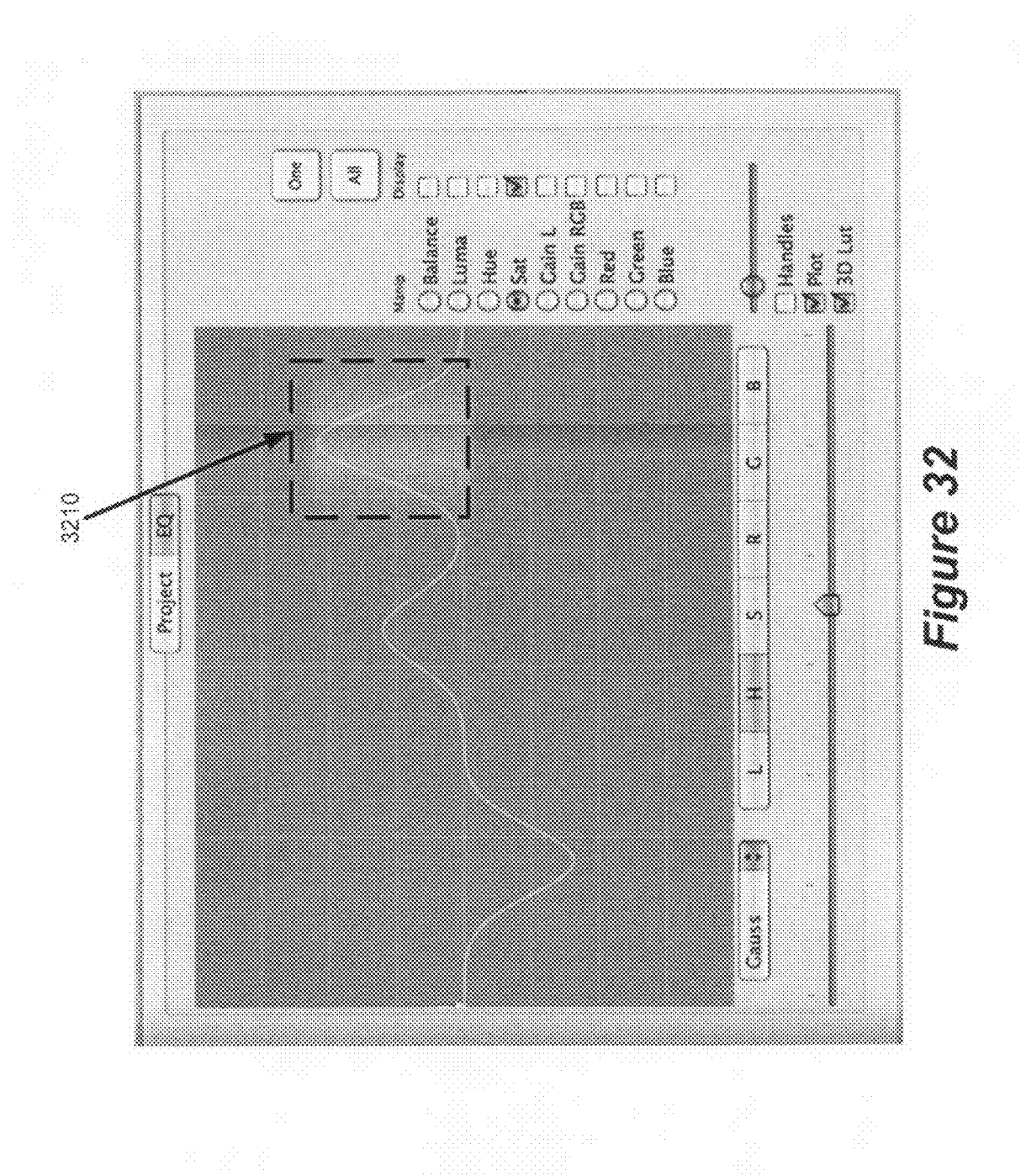

FIGS. 31-32 illustrate specifying multiple different Gaussian bumps over a single graph. Specifically, the graph of FIG. 31 includes two separate Gaussian bumps 3110 and 3120. By double clicking and dragging point 3130 of the graph, a user is able to specify a third Gaussian bump 3210 as shown in FIG. 32.

Figure 33:
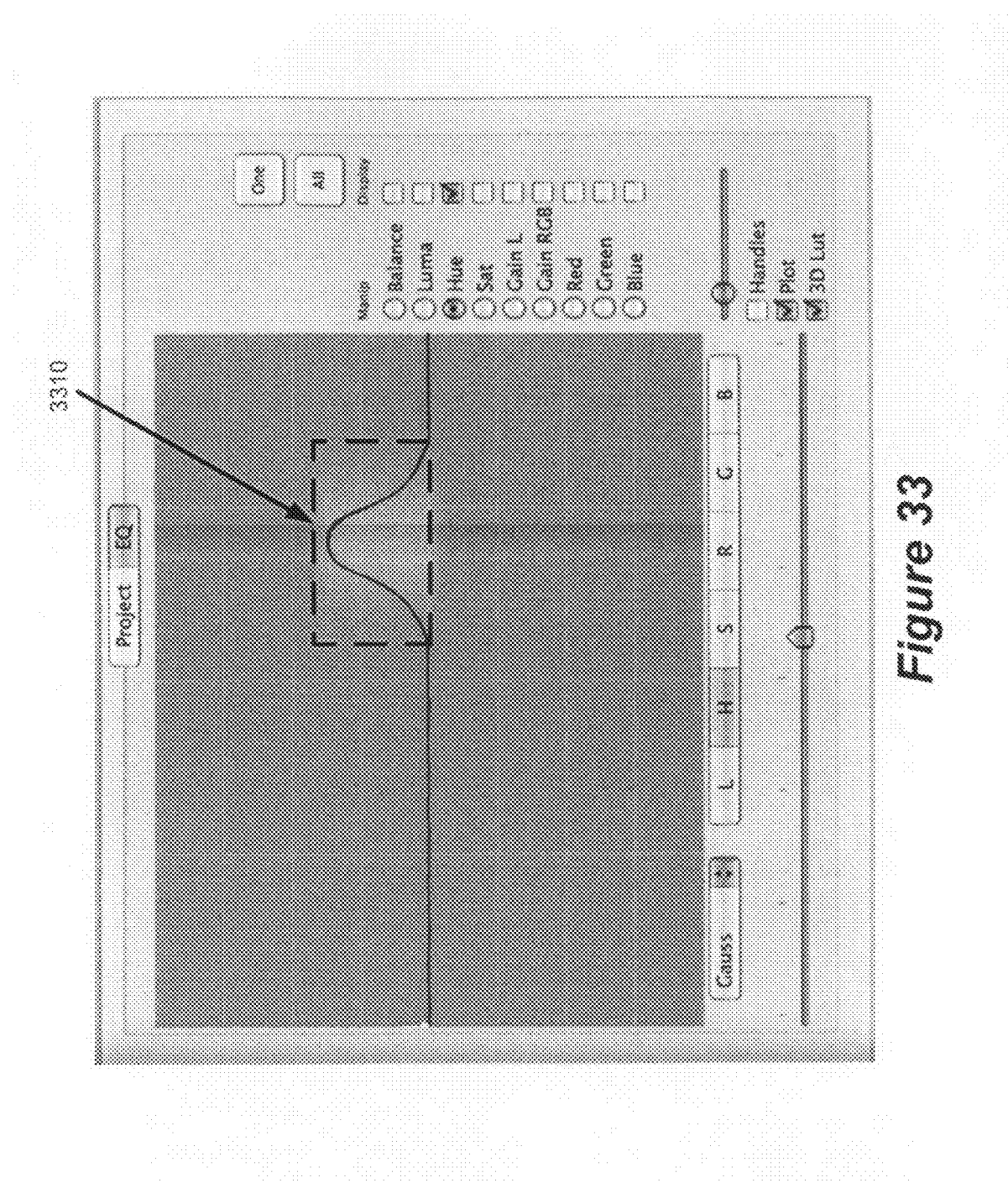
FIG. 33 illustrates moving the distribution of FIG. 27 across the horizontal axis.

In some embodiments, the resulting Gaussian distribution can be moved to any set of color attribute values along the horizontal axis of the display area. In some such embodiments, users perform such an operation by clicking and dragging the distribution to a desired location along the horizontal axis. For instance, FIG. 33 illustrates moving the distribution of FIG. 27 across the horizontal axis to location 3310.

In some embodiments, users are able to switch between the control point graph adjustment tools and the Gaussian manipulator graph adjustment tool at any time. This allows users the ability to combine different color correction adjustments provided by each of the graph adjustment tools. Internally, some embodiments modify the representation of the graph from a parameterized representation to a rasterized representation when switching from the control point graph adjustment tools to the Gaussian manipulator graph adjustment tool and vice versa. In some embodiments, this switching between the different representations is not noticeable by the user, but is performed internally to produce the different results.

To perform the switching, some embodiments maintain the location of the control points at all times and map the control points to the graph when switching from the rasterized representation to the parameterized representation. Several techniques to perform such a mapping are known in the art. See, e.g., An Algorithm for Automatically Fitting Digitized Curves by Philip J. Schneider, published by Academic Press Professional, Inc.; (1990).

Figure 34:
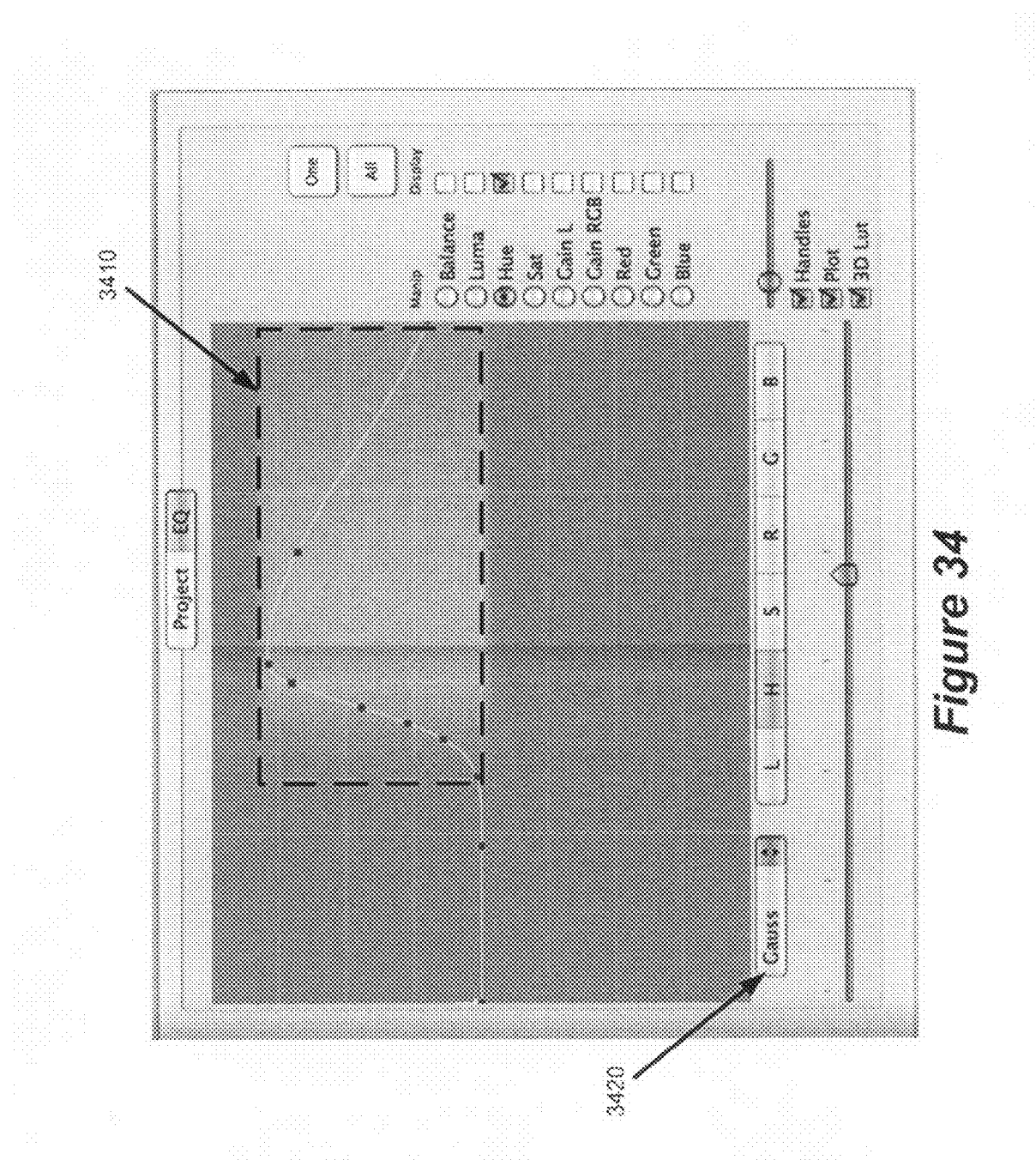
FIG. 34 illustrates a graph after it is adjusted using the Gaussian manipulator.
Figure 35:
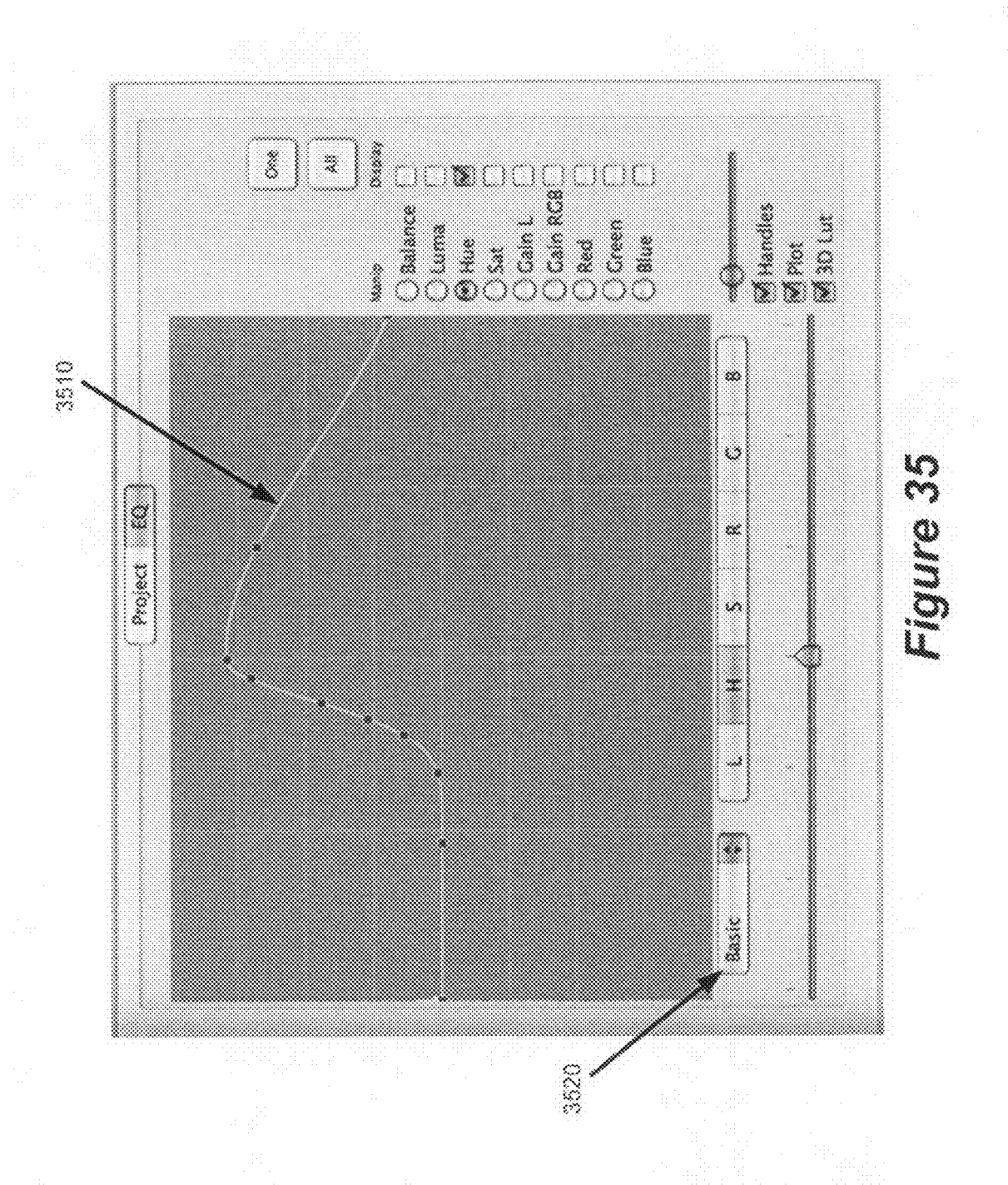
FIG. 35 then illustrates the same graph of FIG. 34 after a user has switched to back to the control points and parameterized curve representation of the graph.
Figure 36:
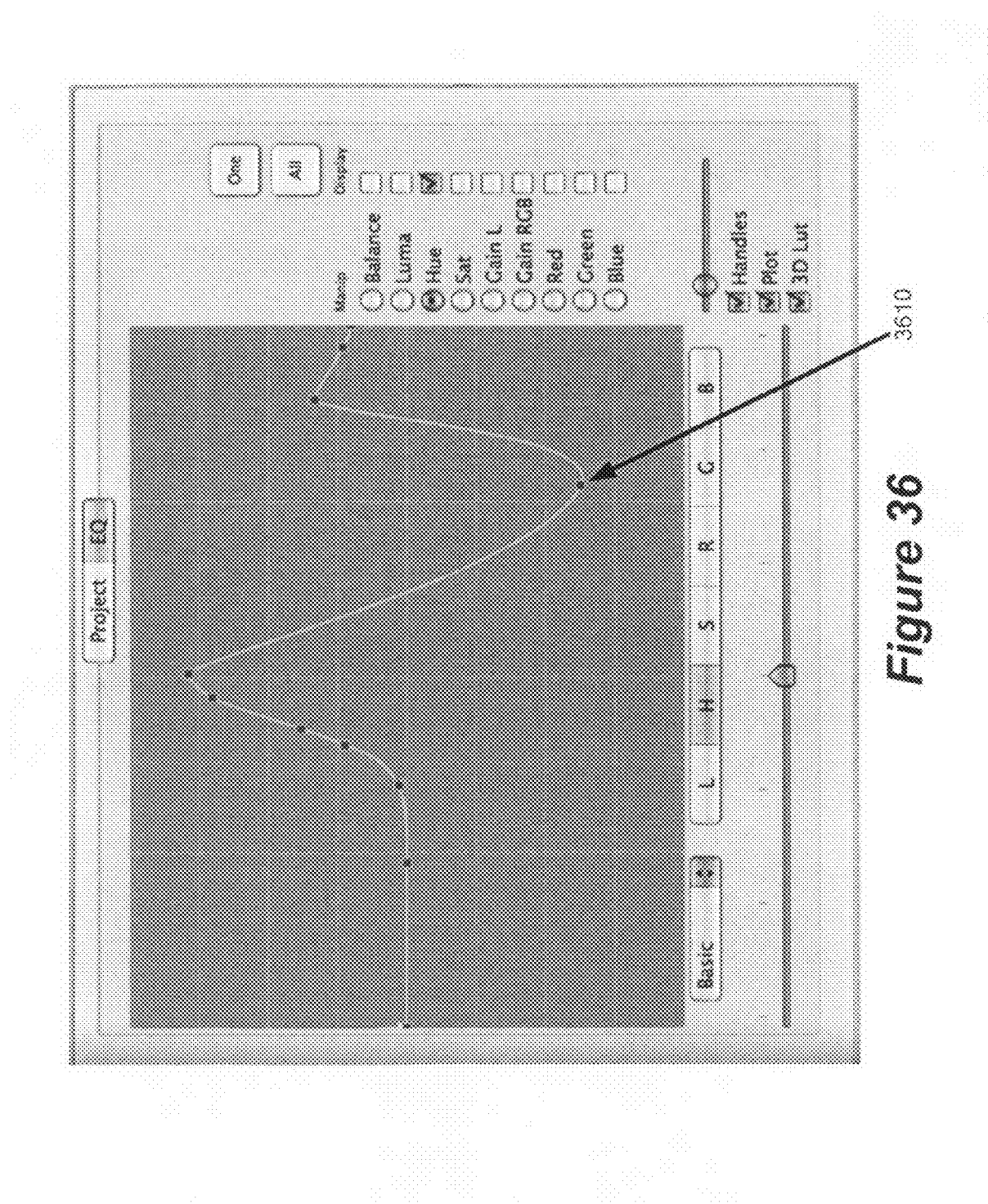
FIG. 36 illustrates specifying additional color correction adjustments through modifications to the control points to complement the previously specified color correction adjustments that were made using the Gaussian manipulator graph adjustment tool.

Accordingly, some embodiments permit the selective switching between (1) the parameterized curves and rasterized curve or (2) switching between the control points and the Gaussian manipulator in order to provide additional color correction functionality for the two or more graph adjustment tools of some embodiments. For instance, FIG. 34 illustrates a graph 3410 after it is adjusted using the Gaussian manipulator 3420. Additionally, FIG. 34 illustrates how some embodiments of the rasterized curve still present the control points of the parameterized curve to the user. In this manner, some embodiments perform the transition between the various representations (e.g., rasterized and parameterized) of the graph seamlessly such that the user is unaware of how the graph is internally processed. FIG. 35 then illustrates the same graph of FIG. 34 after a user has switched to back to the control points and parameterized curve representation of the graph. FIG. 36 illustrates specifying additional color correction adjustments through modifications to the control points (i.e., control point 3610) to complement the previously specified color correction adjustments that were made using the Gaussian manipulator graph adjustment tool.

Moreover, it should be apparent to one of ordinary skill in the art that even though the Gaussian manipulator is described above with reference to a graph that correlates two or more different color attributes, one of ordinary skill in the art will recognize that the Gaussian manipulator is similarly applicable to a graph that correlates a single color attribute.

C. Performing the Color Correction Adjustment

The above described graph adjustment tools (e.g., control points and Gaussian manipulator) provide different means by which to specify color corrections to an image. As noted above, the same adjustment to the graph when specified using the control points produces a different color correction adjustment as when specified using the Gaussian manipulator. More specifically, the adjustments result in a different distribution of the specified color correction over a different set of pixels. It should be apparent to one of ordinary skill in the art that each tool is capable of producing the same effect as the other tool through some combination of adjustments to the graph. However, the control points provide the ability to quickly produce a contrast for a range of color attribute values, while the Gaussian manipulator provides the ability to quickly produce a smooth and blended effect within the image.

Figure 37:
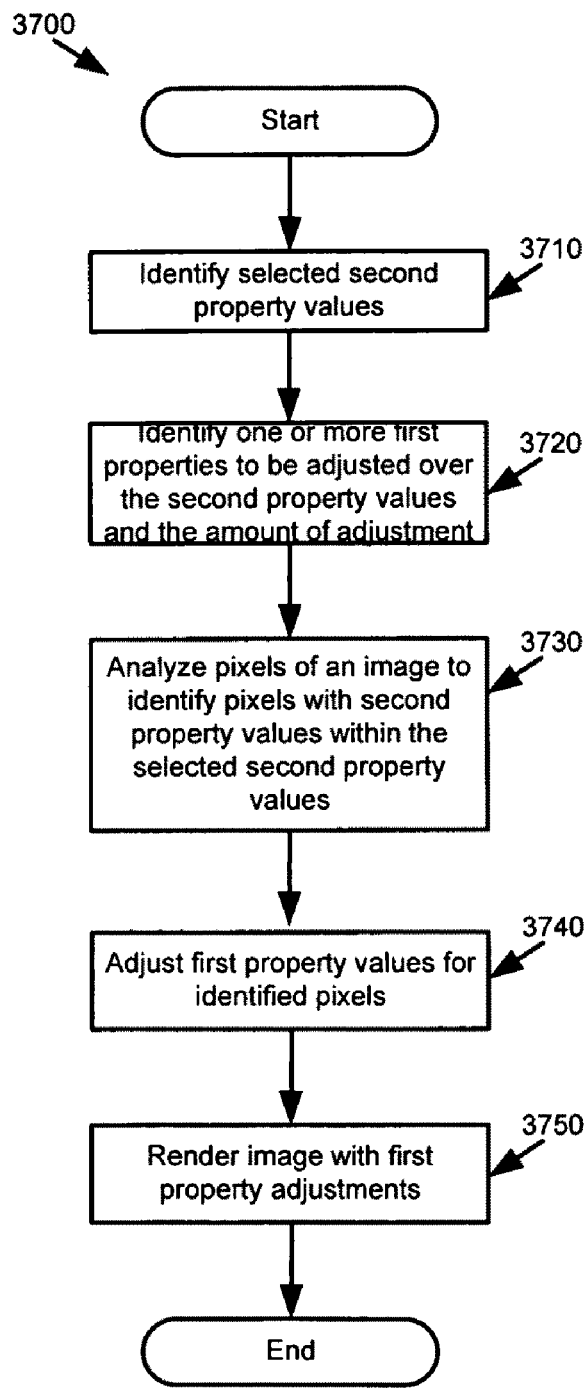
FIG. 37 presents a process for applying relative adjustments to pixels of an image.

FIG. 37 presents a process 3700 for applying the color correction adjustments to pixels of an image in accordance with some embodiments of the invention. The process 3700 begins by identifying (at 3710) one or more selected first color attribute values. The process also identifies (at 3720) the set of second color attributes to be adjusted over the selected first color attribute values and the amount of adjustment.

The process must then locate the pixels of the image that have the selected first color attribute values. Accordingly, the process analyzes (at 3730) the pixels of the image to identify those pixels having the selected first color attribute values.

The process then adjusts (at 3740) the set of second color attribute values for those pixels according to the identified relative amount in step 3720. The image is rendered (at 3750) to illustrate the changes from which the user may specify additional adjustments to the image.

Figure 38:
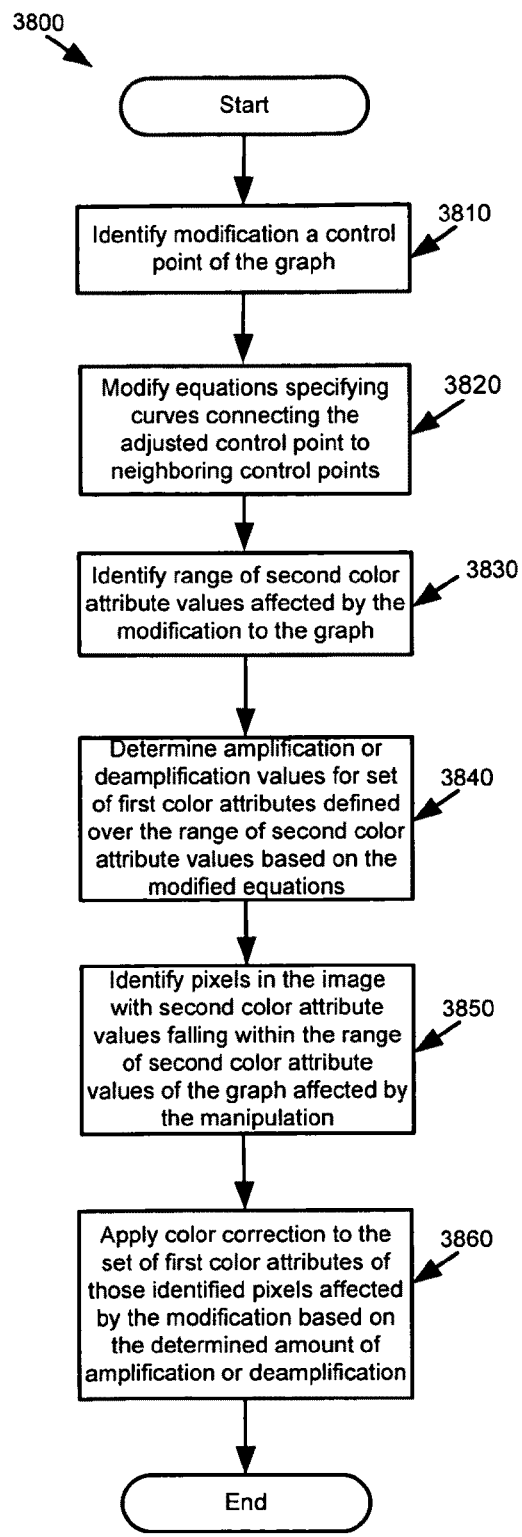
FIG. 38 presents a process for performing a color correction using the control points in accordance with some embodiments.

FIG. 38 presents a process 3800 for performing a color correction using the control points in accordance with some embodiments. The process 3800 begins by identifying (at 3810) an adjustment to a control point of a graph. The process then modifies (at 3820) the equations that define the curves connecting the adjusted control point to neighboring control points. The process identifies (at 3830) the range of first color attribute values affected by the modification to the graph. This range of values includes those first color attribute values that are between control points neighboring the identified adjusted control point at 3810.

From the modified equations and identified range of first color attribute values, the process determines (at 3840) amplification values or deamplification values to distribute over the range of first color attribute values affected by the modification to the graph. To perform the color correction, the process identifies (at 3850) pixels in the image with first color attribute values falling within the range of first color attribute values of the graph affect by the modification. Once one or all such pixels are identified, the process applies (at 3860) the color correction to the set of second color attributes of those pixels according to the determined amount of amplification or deamplification.

Figure 39:
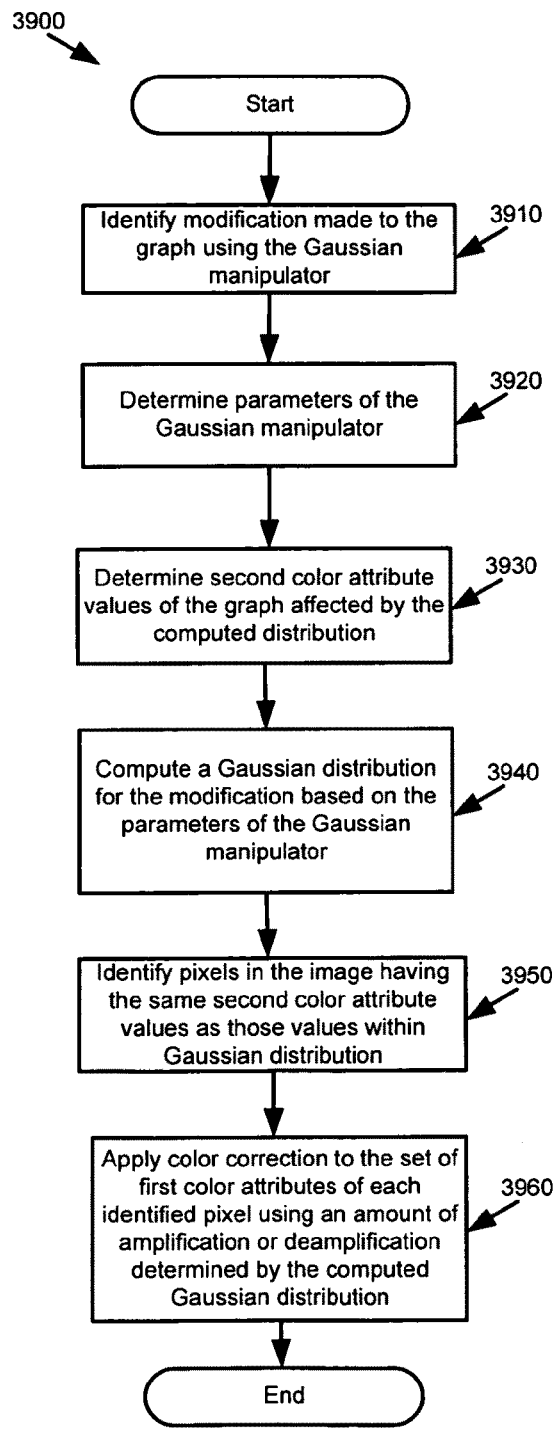
FIG. 39 presents a process for performing a color correction adjustment using the Gaussian manipulator in accordance with some embodiments.

FIG. 39 presents a process 3900 for performing a color correction adjustment using the Gaussian manipulator in accordance with some embodiments. The process 3900 begins by identifying (at 3910) an adjustment made to a graph using the Gaussian manipulator. The process then identifies (at 3920) parameters of the Gaussian manipulator. These parameters include for instance, the amplitude of the Gaussian adjustment and the width of the Gaussian bump from which the range of first color attribute values affected by the modification may be determined (at 3930). The parameters are used to compute (at 3940) a Gaussian distribution over the modified region of the graph. In some embodiments, the Gaussian distribution is computed using the following equation:

$$y=A*\exp(-(x-\mu)^2/(2*\sigma^2)) \quad (1)$$

In equation (1), A represents the amplitude of the Gaussian or the maximum amount of adjustment to a color attribute in the image, $\mu$ represents the mean of the distribution or the Gaussian peak which receives the full amount of adjustment, $\sigma$ represents the width of the Gaussian, x represents a first color attribute value along the horizontal axis of the graph, and y represents the amount of amplification or deamplification resulting from the Gaussian distribution for a particular first color attribute value. In some embodiments, the Gaussian distribution is restricted to a certain range of first color attribute values by specifying a certain threshold that when reached causes the distribution to cease.

As noted above, some embodiments allow for the Gaussian manipulator to selectively affect a set of values on either side of the Gaussian mean. To do so, some embodiments restrict the computation to include only those first color attribute values greater than or less than the value of the selected mean.

The process then identifies (at 3950) pixels in the image with first color attribute values the same as those affected by the modification to the graph. Once the pixels are identified, the process applies the color correction to the set of second color attributes of each identified pixel by adjusting the second color attribute values according to an amount of amplification or deamplification determined from the computed Gaussian distribution.

IV. Media Editing Application

Figure 40:
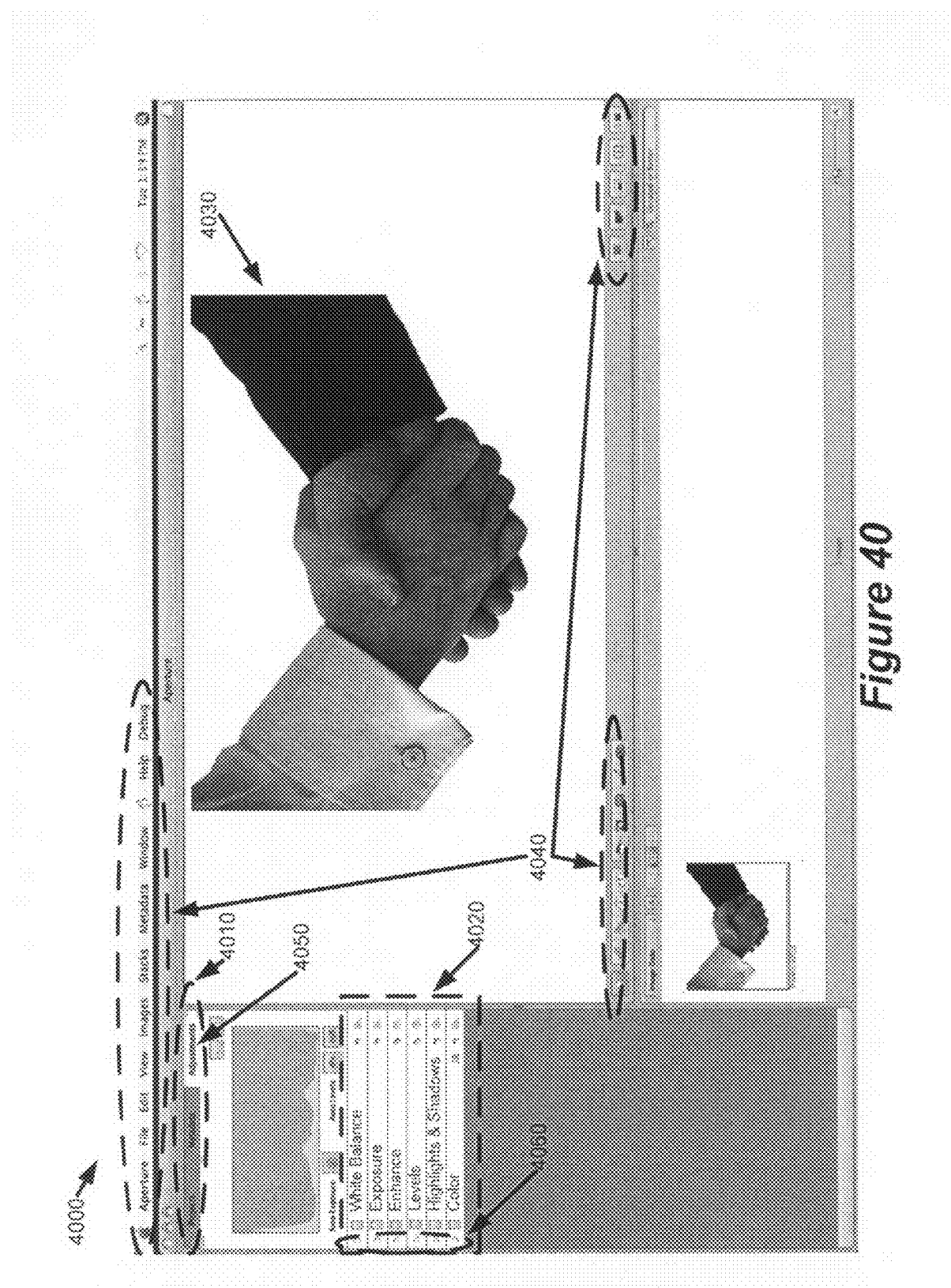
FIG. 40 shows a media editing application in accordance with some embodiments of the invention.

FIG. 40 shows a media editing application 4000 in accordance with some embodiments of the invention. The media editing application 4000 provides (1) a set of selectable tabs 4010 that reveal various functions 4020 for modifying an image, (2) a main display window 4030 to display the image, and (3) a set of various menu controls and selectable icons 4040 to further adjust the image by providing different views of the image or by providing additional functionalities.

The set of selectable tabs 4010 provide a means to access data relating to a project, data relating to an image, or functions to apply to the image. The various media editing functions are incorporated within sets of collapsible function menus 4020. Each of the collapsible function menus 4020 contain groups of related functions and parameters for adjusting the effect produced by a function. Each function is expandable and collapsible through the selectable user interface items 4060.

In some embodiments, the media editing interface described above is activated through a function within at least one of the collapsible function menus 4020 or through one of the menu controls or selectable icons 4040. The media editing interface is incorporated into the media editing application as built-in functionality or as a separate software module plug-in component that is compatible with the media editing application. Therefore it should be apparent to one of ordinary skill in the art that the media editing interface of some embodiments operates with any number of media editing applications such as Apple Aperture®, iPhoto®, iMovie®, Final Cut Pro®, Motion®, Adobe Photoshop®, Corel Paintshop Pro®, etc.

In some embodiments, the effects produced by the media editing interface and other functions of the media editing application are not directly to the image. Rather, the image undergoing editing is retained within a cache or memory buffer until the effects of the function are permanently applied through a save command or the exit command. Additionally, in some embodiments, the resulting image displayed after applying the function is a new image frame separate from the received frame. In this manner, the effects of the function can be undone by reverting back to the received frame. Accordingly, some embodiments generate new frames for each function modification so that several changes can be undone without having to recompute each such change. In other embodiments the adjustments are made directly to a frame buffer and undoing each change requires rerendering the image.

In applying the functions, some embodiments generate and store a redundant copy of an original unmodified image (i.e., no applied effects) and apply the activated or modified function to the redundant copy. In some embodiments, this is referred to as nondestructive image processing in which the original image is never modified. Rather, the redundant copy that is created and stored alongside the original unmodified image is loaded into the image-editing application. The image-editing application renders all effects to the redundant copy. Therefore, if a user specifies removing a function or modifying a function at any time, the image-editing application may simply discard the redundant copy and create another duplicate from the original unmodified image on which to reapply the one or more functions. Nondestructive image processing is a feature of many image-editing applications such as Apple Aperture®.

In some embodiments, the media editing application has several additional functionalities in addition to those described above. For instance, in some embodiments, the media editing application provides a set of tools for (1) organizing images into different collections of images (e.g., different digital photo albums), (2) organizing the images by tagging images with informative keywords, (3) organizing the images by marking selected images as favorites, or (4) organizing the images by rating each image. The media editing application can also publish images into a "photo book" of images, publish the images on the World Wide Web, or publish the images as individual image prints.

Each photo book has several pages that have one or more picture fields for presenting pictures. Different photo books can differ in their size, themes, covers, page designs, page colors, picture-field designs, picture-field layouts, and/or other attributes. In some embodiments, a user can modify the page design, color, frame design, and/or other thematic aspects of a selected photo books. Also, in some embodiments, the user can add picture and text fields to the photo book. Examples of media editing applications with such additional functionality include Apple iPhoto® and Apple Aperture®.

V. Computer System

Many of the above-described media editing interfaces and media editing applications are implemented as software processes that are specified as a set of instructions recorded on a machine readable medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention.

Figure 41:
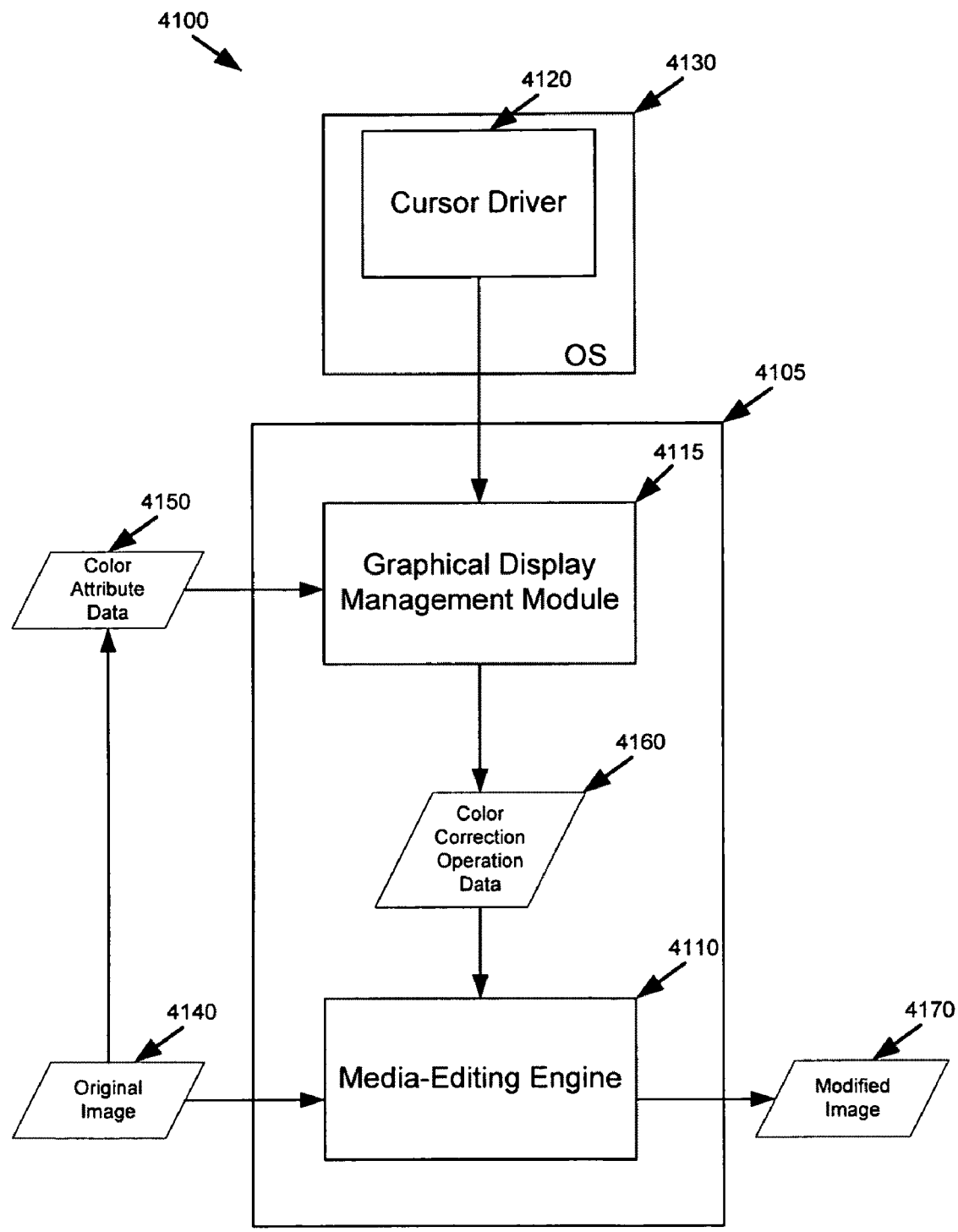
FIG. 41 conceptually illustrates the software architecture for a media editing interface of some embodiments.

FIG. 41 conceptually illustrates the software architecture 4100 for a media editing interface 4105 of some embodiments. FIG. 41 illustrates a media-editing engine 4110 and a graphical display management module 4115 of the media editing interface 4105 and a cursor driver 4120 which in some embodiments is part of operating system 4130. FIG. 41 also illustrates original image data 4140, color attribute data of the image 4150, color correction operation data 4160, and modified image data 4170.

The graphical display management module 4115 generates a graph correlating a first color attribute to a set of second color attributes from the original image data 4140 by identifying the various color attributes data 4150 of the image data 4140. The correlation of the color attributes to display the graph is described in detail in Section II above. Additionally, the graphical display management module 4115 monitors interactions with the graph based on input from the cursor driver 4120.

Upon detection of a user interaction with the graph specifying a color correction adjustment, the graphical display management module 4115 passes the specified color correction adjustment data 4160 to the media-editing engine 4110, which also receives the original image 4140. The color correction operation data 4160 specifies the type of color correction adjustment, the color attributes involved in the adjustment, the amount of adjustment, and the pixels affected by the adjustment. Based on the data, the media-editing engine 4110 performs the color correction to the image using one of the above described methods in Section III above. The media-editing engine 4110 applies the color correction adjustment to the original image 4140 to produce a modified image 4170.

Figure 42:
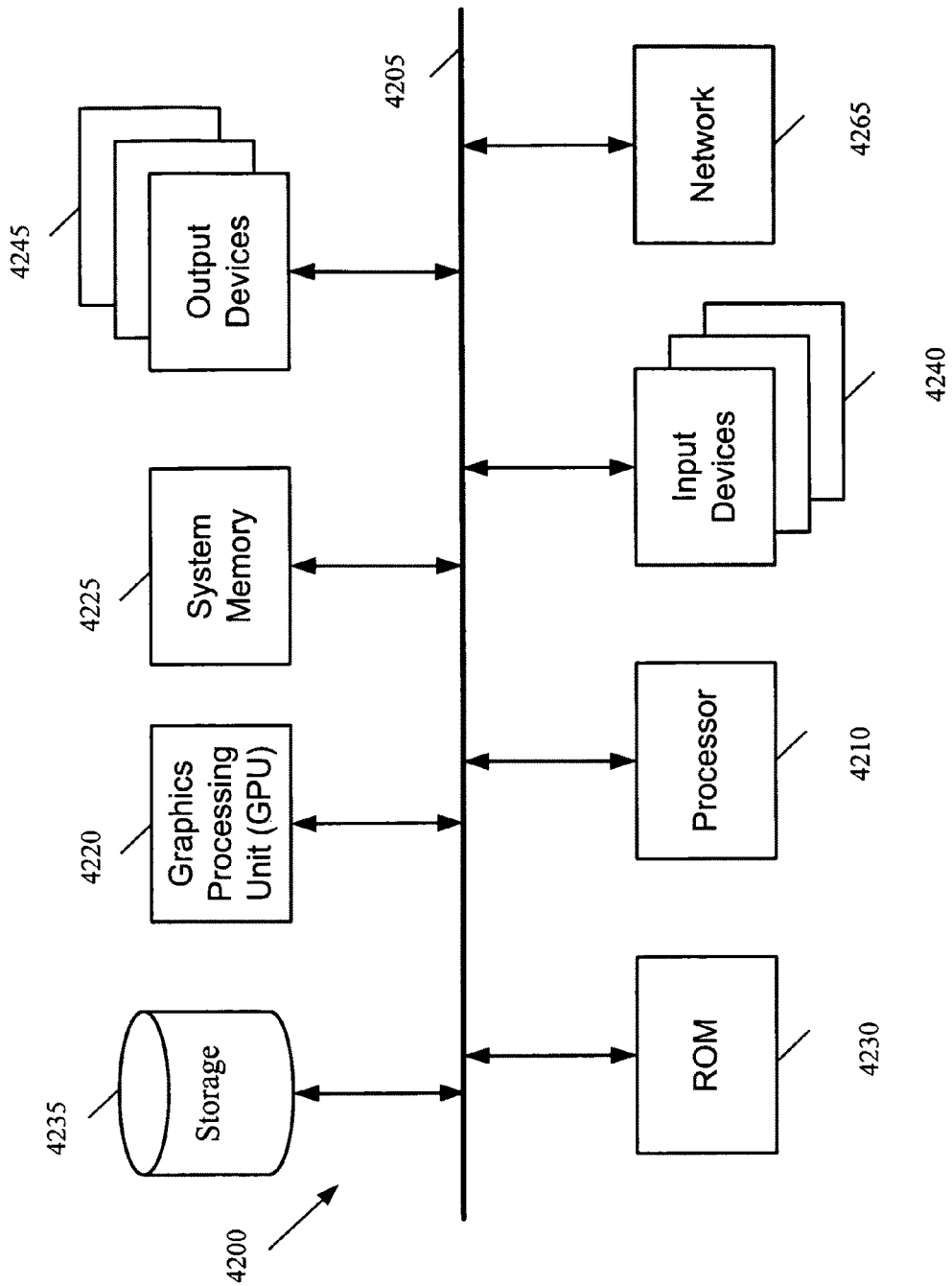
FIG. 42 illustrates a computer system with which some embodiments of the invention are implemented.

FIG. 42 illustrates a computer system with which some embodiments of the invention are implemented. Computer system 4200 includes a bus 4205, a processor 4210, a graphics processing unit (GPU) 4220, a system memory 4225, a read-only memory 4230, a permanent storage device 4235, input devices 4240, and output devices 4245.

The bus 4205 collectively represents all system, peripheral, and chipset buses that communicatively connect the numerous internal devices of the computer system 4200. For instance, the bus 4205 communicatively connects the processor 4210 with the read-only memory 4230, the GPU 4220, the system memory 4225, and the permanent storage device 4235.

From these various memory units, the processor 4210 retrieves instructions to execute and data to process in order to execute the processes of the invention. Some instructions are passed to and executed by the GPU 4220. The GPU 4220 can offload various computations or complement the image processing provided by the processor 4210.

The read-only-memory (ROM) 4230 stores static data and instructions that are needed by the processor 4210 and other modules of the computer system. The permanent storage device 4235, on the other hand, is a read-and-write memory device. This device is a non-volatile memory unit that stores instructions and data even when the computer system 4200 is off. Some embodiments of the invention use a mass-storage device (such as a magnetic or optical disk and its corresponding disk drive) as the permanent storage device 4235.

Other embodiments use a removable storage device (such as a floppy disk or ZIP® disk, and its corresponding disk drive) as the permanent storage device. Like the permanent storage device 4235, the system memory 4225 is a read-and-write memory device. However, unlike storage device 4235, the system memory is a volatile read-and-write memory, such a random access memory. The system memory stores some of the instructions and data that the processor needs at runtime. In some embodiments, the invention's processes are stored in the system memory 4225, the permanent storage device 4235, and/or the read-only memory 4230. Together or separate, the above mentioned memories and storage devices comprise the computer readable medium of the computer system on which the media editing application is stored and executed from, the objects used within the media editing application are stored, and the files for defining the composition of the objects and behaviors of the objects within the 3D space of the media editing application.

The bus 4205 also connects to the input and output devices 4240 and 4245. The input devices enable the user to communicate information and select commands to the computer system. The input devices 4240 include alphanumeric keyboards and pointing devices. The output devices 4245 display images generated by the computer system. For instance, these devices display a graphical user interface. The output devices include printers and display devices, such as cathode ray tubes (CRT) or liquid crystal displays (LCD).

Finally, as shown in FIG. 42, bus 4205 also couples computer 4200 to a network 4265 through a network adapter (not shown). In this manner, the computer can be a part of a network of computers (such as a local area network ("LAN"), a wide area network ("WAN"), or an Intranet, or a network of networks, such as the internet. For example, the computer 4200 may be coupled to a web server (network 4265) so that a web browser executing on the computer 4200 can interact with the web server as a user interacts with a graphical user interface that operates in the web browser. Any or all components of computer system 4200 may be used in conjunction with the invention.

While the invention has been described with reference to numerous specific details, one of ordinary skill in the art will recognize that the invention can be embodied in other specific forms without departing from the spirit of the invention. For instance, Apple Mac OS® environment and Apple Aperture® are used to create some of these examples, a person of ordinary skill in the art would realize that the invention may be practiced in other operating environments such as Microsoft Windows®, UNIX®, Linux, etc., and other applications such as Autodesk Maya®, and Autodesk 3D Studio Max®, etc. Also, some of the examples may be executed on a GPU or CPU of a computer system depending on the computing resources available on the computer system or alternatively on any electronic device that is able to provide media editing functionality. Thus, one of ordinary skill in the art would understand that the invention is not to be limited by the foregoing illustrative details, but rather is to be defined by the appended claims.

We claim:

1. A method for modifying color attributes of an image using a media editing application, the method comprising:
providing a display area for displaying a modifiable graph correlating a first color attribute of the image to a plurality of second color attributes of the image, wherein the graph is displayed as a deformable curve in the display area; and
providing at least one graph adjustment tool for adjusting at least one of the plurality of second color attributes relative to the first color attribute of the image, wherein the graph adjustment tool specifies a color correction adjustment to second color attribute values identified by a set of first color attribute values.

2. The method of claim 1 further comprising adjusting values of at least one of the second color attributes identified by first color attribute values using said graph adjustment tool.

3. The method of claim 1 further comprising identifying at least one first color attribute value and an amount of adjustment to apply to a second color attribute at pixels of the image having said first color attribute value using said graph adjustment tool.

4. The method of claim 1, wherein providing the display area comprises providing a first set of items for selecting the first color attribute to identify the pixels of the image at which to adjust the second color attribute and a second set of items for selecting the set of second color attributes to adjust.

5. The method of claim 4, wherein the first color attribute is represented by a first axis of the graph and the set of second color attributes is represented by a second axis of the graph.

6. The method of claim 1, wherein the deformable curve is a raster curve.

7. The method of claim 1, wherein the graph adjustment tool provides a user interface item displayed along the graph for adjusting the Gaussian distribution to apply over the first color attribute values.

8. The method of claim 1 further comprising providing a selectable item that when selected causes a plurality of control points to be displayed along the deformable curve, wherein a movement of a control point at a particular location along the curve specifies an adjustment to a second color attribute relative to a first color attribute according to parameterizable curves defining connections between the control point and at least one neighboring control point along the curve.

9. The method of claim 1, wherein the deformable curve is a first representation of the graph, the method further comprising providing at least one selectable item for switching between the first representation and a second representation of the graph comprising a plurality of control points for deforming said graph in order to specify an adjustment to a set of second color attributes relative to a range of values of a first color attribute.

10. The method of claim 9, wherein the second representation of the graph comprises a plurality of parameterized curves for defining connections between the set of control points according to a plurality of mathematical functions.

11. The method of claim 10, wherein the parameterized curves comprise Bezier curves.

12. The method of claim 11, wherein the second representation of the graph comprises modifiable tangent lines at the control points for adjusting modifications to the graph.

13. The method of claim 1, wherein the first and second color attributes comprise at least one of color balance, luminance, hue, saturation, red color, green color, and blue color attributes of the image.

14. The method of claim 1, wherein the first color attribute is changeable at any time during adjustments to the second color attribute such that the second color attribute is adjusted relative to at least two different first color attributes.

15. The method of claim 1, wherein the first and second color attributes do not specify the same color attribute.

16. A non-transitory machine readable medium storing a program comprising a graphical user interface (GUI), the program comprising instructions that when executed by at least one processing unit, generate a GUI comprising:
a display area for displaying a modifiable graph correlating a first color attribute of the image to a plurality of second color attributes of the image, wherein the modifiable graph comprises a deformable curve; and
at least one graph adjustment tool for adjusting at least one of the plurality of second color attributes relative to the first color attribute of the image, wherein the graph adjustment tool specifies a color correction adjustment to second color attributes identified by a set of first color attribute values.

17. The non-transitory machine readable medium of claim 16, wherein the display area is a first display area, the GUI further comprising a second display area for rendering said image with adjustments specified using the graph adjustment tool.

18. The non-transitory machine readable medium of claim 16, wherein the GUI further comprises a first set of items for selecting the first color attribute to identify the pixels of the image at which to adjust the second color attribute and a second set of items for selecting the set of second color attributes to adjust.

19. The non-transitory machine readable medium of claim 18, wherein the first color attribute is represented by a first axis of the graph and the set of second color attributes is represented by a second axis of the graph.

20. The non-transitory computer readable medium of claim 16, wherein the first color attribute is changeable at any time during adjustments to the second color attribute such that the second color attribute is adjusted relative to at least two different first color attributes.

21. The non-transitory computer readable medium of claim 16, wherein the first and second color attributes comprise at least one of color balance, luminance, hue, saturation, red color, green color, and blue color attributes of the image.

22. A non-transitory computer readable medium storing a computer program comprising instructions that, when executed by at least one processing unit, perform operations comprising:
displaying in a display area a modifiable graph correlating a first color attribute of an image to a plurality of second color attributes of the image, wherein the modifiable graph comprises a deformable curve; and
adjusting, using at least one graph adjustment tool, at least one of the plurality of second color attributes relative to the first color attribute of the image, wherein the graph adjustment tool specifies a color correction adjustment to second color attributes identified by a set of first color attribute values.

23. The non-transitory computer readable medium of claim 22, wherein the deformable curve is represented as a raster curve or a parameterized curve, wherein the computer program further comprises a set of instructions for switching between the raster curve representation and the parameterized curve representation.

24. The non-transitory computer readable medium of claim 22, wherein the first color attribute is represented by a first axis of the graph and the set of second color attributes is represented by a second axis of the graph.

25. The non-transitory computer readable medium of claim 22, wherein the computer program further comprises a set of instructions for identifying at least one first color attribute value and an amount of adjustment to apply to a second color attribute at pixels of the image having said first color attribute value using said graph adjustment tool.

26. A method for modifying color attributes of an image using a media editing application, the method comprising:
displaying in a display area a modifiable graph correlating a first color attribute of an image to a plurality of second color attributes of the image, wherein the modifiable graph comprises a deformable curve; and
adjusting, using at least one graph adjustment tool, at least one of the plurality of second color attributes relative to the first color attribute of the image, wherein the graph adjustment tool specifies a color correction adjustment to second color attribute values identified by a set of first color attribute values.

27. The method of claim 26, wherein the deformable curve is represented as a raster curve or a parameterized curve, the method further comprising switching between the raster curve representation and the parameterized curve representation.

* * * * *